US006582842B1

(12) United States Patent
King

(10) Patent No.: US 6,582,842 B1
(45) Date of Patent: Jun. 24, 2003

(54) ENHANCEMENT OF PROTON EXCHANGE MEMBRANE FUEL CELL SYSTEM BY USE OF RADIAL PLACEMENT AND INTEGRATED STRUCTURAL SUPPORT SYSTEM

(75) Inventor: George R. King, The Woodlands, TX (US)

(73) Assignee: Reliant Energy Power Systems, Inc., Houston, TX (US)

( * ) Notice: Subject to any disclaimer, the term of this patent is extended or adjusted under 35 U.S.C. 154(b) by 68 days.

(21) Appl. No.: 09/711,197

(22) Filed: Nov. 9, 2000

Related U.S. Application Data

(63) Continuation-in-part of application No. 09/669,344, filed on Sep. 26, 2000.

(51) Int. Cl.[7] .............................. H01M 8/06; H01M 8/10
(52) U.S. Cl. .............................. 429/19; 429/20; 429/32; 429/38
(58) Field of Search .............................. 429/19, 20, 32, 429/38

(56) References Cited

U.S. PATENT DOCUMENTS

| 3,615,862 | A | 10/1971 | Roth et al. ............. 136/120 FC |
| 3,772,086 | A | 11/1973 | Zeitner, Jr. et al. .... 136/120 FC |
| 3,960,601 | A | 6/1976 | Schulz .................. 136/120 FC |
| 4,044,193 | A | 8/1977 | Petrow et al. ................ 429/40 |
| 4,108,756 | A | 8/1978 | de Nora et al. ............. 204/286 |
| 4,131,721 | A | 12/1978 | Fung et al. .................... 429/13 |
| 4,168,351 | A | 9/1979 | Taylor ........................... 429/48 |
| 4,192,907 | A | 3/1980 | Jalan et al. .................... 429/40 |
| 4,356,240 | A | 10/1982 | Dey et al. .................... 429/101 |
| 4,372,759 | A | 2/1983 | Sederquist et al. ............ 55/73 |
| 4,390,446 | A | 6/1983 | Barnette et al. .......... 252/182.1 |
| 4,396,480 | A | 8/1983 | Hegedus et al. .............. 429/33 |
| 4,413,041 | A | 11/1983 | Hegedus ....................... 429/33 |
| 4,458,411 | A | 7/1984 | Dey et al. .................. 29/623.2 |
| 4,463,065 | A | 7/1984 | Hegedus et al. .............. 429/33 |
| 4,525,440 | A | 6/1985 | Barnette et al. ............. 429/191 |

(List continued on next page.)

FOREIGN PATENT DOCUMENTS

| DE | 198 12 155 A1 | 9/1999 | ............ H01M/8/06 |
| WO | WO 95/06335 | 3/1995 | ............ H01M/8/06 |
| WO | WO 96/20509 | 7/1996 | ............ H01M/8/24 |
| WO | WO 96/37005 | 11/1996 | ............ H01M/8/04 |
| WO | WO 98/33221 | 7/1998 | ............ H01M/2/00 |
| WO | WO 01/20702 A2 | 3/2001 | ............ H01M/8/06 |
| WO | WO 01/25140 A1 | 4/2001 | ............ C01B/3/38 |

OTHER PUBLICATIONS

Patent Abstracts of Japan; vol. 013, No. 031 (E–707), Jan. 24, 1989 & JP 63 232275 A (Mitsubishi Electric Corp), Sep. 28, 1988 Abstract.

(List continued on next page.)

Primary Examiner—Stephen Kalafut
(74) Attorney, Agent, or Firm—Baker Botts, LLP

(57) ABSTRACT

An improved proton exchange membrane fuel cell system is provided for the economical and efficient production of electricity. The fuel cell system provides a plurality of fuel cell stacks that substantially surround a reformer assembly.

28 Claims, 12 Drawing Sheets

U.S. PATENT DOCUMENTS

| | | | |
|---|---|---|---|
| 4,529,677 A | 7/1985 | Bodendorf | 429/252 |
| 4,556,613 A | 12/1985 | Taylor et al. | 429/101 |
| 4,735,872 A | 4/1988 | Maimoni | 429/27 |
| 4,769,297 A | 9/1988 | Reiser et al. | 429/17 |
| 4,800,138 A | 1/1989 | Romanowski et al. | 429/19 |
| 4,882,232 A | 11/1989 | Bugnet et al. | 428/613 |
| RE33,149 E | 1/1990 | Petrow et al. | 429/40 |
| 4,910,106 A | 3/1990 | Kafchinski et al. | 429/254 |
| 4,925,749 A | 5/1990 | Wright | 429/104 |
| 4,973,358 A | 11/1990 | Jin et al. | 75/415 |
| 4,973,532 A | 11/1990 | Taskier et al. | 429/62 |
| 4,988,583 A | 1/1991 | Watkins et al. | 429/30 |
| 5,008,163 A | 4/1991 | Smith et al. | 429/40 |
| 5,013,618 A | 5/1991 | Luczak | 429/44 |
| 5,068,161 A | 11/1991 | Keck et al. | 429/44 |
| 5,071,717 A | 12/1991 | Bushnell | 429/13 |
| 5,079,105 A * | 1/1992 | Bossel | 429/19 |
| 5,108,849 A | 4/1992 | Watkins et al. | 429/30 |
| 5,139,896 A | 8/1992 | Smith et al. | 429/40 |
| 5,189,005 A | 2/1993 | Watanabe et al. | 502/326 |
| 5,208,207 A | 5/1993 | Stonehart et al. | 502/339 |
| 5,242,764 A | 9/1993 | Dhar | 429/30 |
| 5,264,299 A | 11/1993 | Krasij et al. | 429/30 |
| 5,300,370 A | 4/1994 | Washington et al. | 429/34 |
| 5,316,747 A | 5/1994 | Pow et al. | 423/247 |
| 5,318,863 A | 6/1994 | Dhar | 429/30 |
| 5,344,724 A | 9/1994 | Ozaki et al. | 429/94 |
| 5,360,679 A | 11/1994 | Buswell et al. | 429/19 |
| 5,366,819 A * | 11/1994 | Hartvigsen et al. | 429/19 X |
| 5,366,821 A | 11/1994 | Merritt et al. | 429/21 |
| 5,418,079 A * | 5/1995 | Diethelm | 429/30 X |
| 5,432,021 A | 7/1995 | Wilkinson et al. | 429/17 |
| 5,434,020 A | 7/1995 | Cooper | 429/210 |
| 5,441,819 A | 8/1995 | Voss et al. | 429/13 |
| 5,441,821 A | 8/1995 | Merritt et al. | 429/17 |
| 5,482,680 A | 1/1996 | Wilkinson et al. | 422/177 |
| 5,503,944 A | 4/1996 | Meyer et al. | 429/13 |
| 5,514,487 A | 5/1996 | Washington et al. | 429/39 |
| 5,518,831 A | 5/1996 | Tou et al. | 429/42 |
| 5,521,018 A | 5/1996 | Wilkinson et al. | 42/26 |
| 5,527,363 A | 6/1996 | Wilkinson et al. | 29/623.1 |
| 5,539,002 A | 7/1996 | Watanabe | 521/27 |
| 5,547,776 A | 8/1996 | Fletcher et al. | 429/13 |
| 5,599,638 A | 2/1997 | Surampudi et al. | 429/33 |
| 5,604,057 A | 2/1997 | Nazri | 429/224 |
| 5,607,770 A | 3/1997 | Lewis et al. | 428/408 |
| 5,624,769 A | 4/1997 | Li et al. | 429/32 |
| 5,660,941 A | 8/1997 | Farooque et al. | 429/19 |
| 5,674,644 A | 10/1997 | Nazri | 429/224 |
| 5,683,828 A | 11/1997 | Spear et al. | 429/13 |
| 5,707,755 A | 1/1998 | Grot | 429/40 |
| 5,763,114 A * | 6/1998 | Khandkar et al. | 429/20 |
| 5,773,162 A | 6/1998 | Surampudi et al. | 429/39 |
| 5,776,624 A | 7/1998 | Neutzler | 429/26 |
| 5,776,625 A | 7/1998 | Kaufman et al. | 429/30 |
| 5,804,326 A | 9/1998 | Chow et al. | 429/13 |
| 5,827,495 A | 10/1998 | Tomimatsu et al. | 423/600 |
| 5,858,314 A | 1/1999 | Hsu et al. | 422/211 |
| 5,858,567 A | 1/1999 | Spear, Jr. et al. | 429/12 |
| 5,863,671 A | 1/1999 | Spear, Jr. et al. | 429/12 |
| 5,863,673 A | 1/1999 | Campbell et al. | 429/44 |
| 5,874,182 A | 2/1999 | Wilkinson et al. | 429/30 |
| 5,879,826 A | 3/1999 | Lehman et al. | 429/13 |
| 5,928,807 A | 7/1999 | Elias | 429/35 |
| 5,935,726 A | 8/1999 | Chow et al. | 429/13 |
| 5,942,346 A | 8/1999 | Ahmed et al. | 429/20 |
| 5,976,726 A | 11/1999 | Wilkinson et al. | 429/35 |
| 5,993,987 A | 11/1999 | Wozniczka et al. | 429/37 |
| 6,017,650 A | 1/2000 | Ramunni et al. | 429/42 |
| 6,020,083 A | 2/2000 | Breault et al. | 429/36 |
| 6,022,634 A | 2/2000 | Ramunni et al. | 429/34 |
| 6,030,718 A | 2/2000 | Fuglevand et al. | 429/26 |
| 6,033,793 A | 3/2000 | Woods et al. | 429/17 |
| 6,033,804 A | 3/2000 | Doyle et al. | 429/212 |
| 6,037,076 A | 3/2000 | Tomimatsu et al. | 429/46 |
| 6,042,922 A | 3/2000 | Senoo et al. | 428/66.6 |
| 6,051,331 A | 4/2000 | Spear, Jr. et al. | 429/34 |
| 6,053,266 A | 4/2000 | Greenhill et al. | 180/65.3 |
| 6,057,053 A | 5/2000 | Gibb | 429/37 |
| 6,060,190 A | 5/2000 | Campbell et al. | 429/40 |
| 6,063,515 A | 5/2000 | Epp et al. | 429/17 |
| 6,071,636 A | 6/2000 | Mosdale | 429/34 |
| 6,074,692 A | 6/2000 | Hulett | 427/115 |
| 6,096,448 A | 8/2000 | Wilkinson et al. | 429/13 |
| 6,096,449 A | 8/2000 | Fuglevand et al. | 429/13 |
| 6,096,450 A | 8/2000 | Walsh | 429/34 |
| 6,099,984 A | 8/2000 | Rock | 429/39 |
| 6,103,077 A | 8/2000 | DeMarinis et al. | 204/290.07 |
| 6,106,964 A | 8/2000 | Voss et al. | 429/20 |
| 6,110,333 A | 8/2000 | Spethmann et al. | 204/252 |
| 6,124,053 A | 9/2000 | Bernard et al. | 429/34 |
| 6,127,056 A | 10/2000 | Wheeler et al. | 429/13 |
| 6,146,781 A | 11/2000 | Surampudi et al. | 429/35 |
| 6,165,633 A | 12/2000 | Negishi | 429/17 |
| 6,197,445 B1 | 3/2001 | Ward et al. | 429/163 |
| 6,203,940 B1 | 3/2001 | Oltman et al. | 429/122 |
| 6,207,308 B1 | 3/2001 | Grasso et al. | 429/26 |
| 6,207,309 B1 | 3/2001 | Bonville et al. | 429/26 |
| 6,210,820 B1 | 4/2001 | Knights et al. | 429/13 |
| 6,210,826 B1 | 4/2001 | Dopp et al. | 429/122 |
| 6,210,827 B1 | 4/2001 | Dopp et al. | 429/122 |
| 6,218,035 B1 | 4/2001 | Fuglevand et al. | 429/30 |
| 6,232,008 B1 | 5/2001 | Wozniczka et al. | 429/39 |
| 6,238,817 B1 | 5/2001 | Reiser | 429/34 |
| 6,242,118 B1 | 6/2001 | Grasso et al. | 429/13 |
| 6,248,462 B1 | 6/2001 | Bonville | 429/24 |
| 6,265,093 B1 | 7/2001 | Surampudi et al. | 429/13 |
| 6,268,076 B1 | 7/2001 | Diekmann et al. | 429/30 |
| 6,277,508 B1 | 8/2001 | Reiser et al. | 429/17 |
| 6,303,244 B1 | 10/2001 | Surampudi et al. | 429/17 |
| 6,316,134 B1 | 11/2001 | Cownden et al. | 429/19 |
| 6,331,366 B1 | 12/2001 | Van Dine et al. | 429/17 |
| 2001/0031389 A1 | 10/2001 | Appleby et al. | 429/40 |

OTHER PUBLICATIONS

Patent Abstracts of Japan, vol. 017, No. 334 (E–1387), Jun. 24, 1993 & JP 05 041239 A (NKK Corp.) Feb. 19, 1993 Abstract.

Bain, et al, "Sourcebook for Hydrogen Applications," Hydrogen Research Institute and National Research Energy Laboratory, 1988. (Month Not Applicable).

Dhar, Hari P., "On Solid Polymer Fuel Cells," Journal of Electroanalytical Chemistry, BCS Technology Inc., Bryan, TX. (Oct. 1993).

Bernardi, Dawn M., "Water–Balance Calculations for Solid–Polymer–Electrolyte Fuel Cells," Journal of the Electrochemical Society, Physical Chemistry Department, General Motors Research Laboratories, Michigan, vol. 137, No. 11 (1990) (Nov.).

Hendel, Frank J., "Water Recovery From Fuel Cells and Lunar Minerals," I & EC, vol. 56, No. 3, (1964) (Mar.).

Journal of Power Sources, "Recent Advances in Solid Polymer Electrolyte Fuel Cell Technology with Low Platinum Loading Electrodes," vol. 29, (1990) pp. 367–387 (Month Unknown).

Journal of Power Sources, "Advances in Solid Polymer Electrolyte Fuel Cell Technology with Low Platinum Loading Electrodes," vol. 22, (1988), pp. 359–375 (Month unknown).

Journal of Power Sources, "The Renaissance of the Solid Polymer Fuel Cell," vol. 29, (1990) pp. 239–250 (Month Unknown).

Journal of Power Sources, "Solid Polymer Fuel Cell Developments at Ballard," vol. 37, (1992), pp. 181–188 (Month Unknown).

Proceedings of the Symposium on Fuel Cells, Industrial Electrolytic Division, New Jersey, vol. 89–14 (Nov. 1989).

"Operation Characteristics of a Solid Polymer Fuel Cell," Royal Military College of Canada, Ontario, Canada (Date not supplied).

"Stainless Steel Wire Mesh Flow–Fields for Polymer Electrolyte Fuel Cells," Electronic and Electrochemical Materials and Devices Research Group, New Mexico (Date Not Supplied).

"The Proton Exchange Membrane Fuel Cell—A Strong Candidate as a Power Source for Electric Vehicles," Center for Electrochemical Systems and Hydrogen Research, Texas A & M University System, Texas (Date Not Supplied).

"Fuel Cells for Scooters, " A. John Appleby (Date Not Supplied).

"High Performance Proton Exchange Membrane Fuel Cell Stacks: Electrochemistry; Materials, and Engineering," Texas Engineering Experiment Station (Aug. 1999).

Appleby, A.J. "Fuel Cell Technology: Status and Future Prospects," *Energy* vol. 21 No. 7/8, pp 521–653 (1996) (Month Unknown).

Larminie, James, Dicks, Andrew "Fuel Cell Systems Explained" John Wiley & Sons, Ltd., England (2000) (Month N/A).

Koppel, T. "Powering the Future: the Ballard Fuel Cell and the Race to Change the World," John Wiley & Sons Canada, Ltd. (1999) (Month N/A).

Appleby, A.J., Foulkes, F.R. "Fuel Cell Handbook," Van Nostrand Reinhold, New York (1989) (Month N/A).

Blomen, Leo J.M.J.; Mugerwa, Michael N.; "Fuel Cell System," Plenum Press, New York (1993) (Month N/A).

Appleby, A.J.; "Characteristics of Fuel Cell Systems," Plenum Press, New York (1993) (Month N/A).

Barendrech, Embrecht, Chapter 3, "Electrochemistry of Fuel Cells," Plenum Press, New York (1993) (Month N/A).

"Encyclopedia of Chemical Processing and Design," vol. 24, pps. 1–27 (Date Not Supplied).

"Journal of Applied Electrochemistry," vol. 29, No. 12, (Dec. 1999) (pp. 1410–1416).

Gurau, Vladimir; Barbir, Frano; Liu, Hongtan; "Two–Dimensional Model for the Entire Sandwich of a PEM Fuel Cell," Electrochemical Society Proceedings vol. 98–27. (Date Not Supplied).

Friedman, D.J., Moore, R.M., "PEM Fuel Cell System Optimization," Electrochemical Society Proceedings vol. 98–27. (Date Not Supplied).

Avista Labs, Avista Corp.; *Introducing Local Area Energy Generation from Avista Labs*, available at http://www.avistalabs.com/default.asp (2000, Month Unknown).

Plug Power–President's Message; available at www.plugpower.com/about/president.html (Date Not Supplied).

United States Council for Automotive Research; *Quick–Start Catalytic Fuel–Flexible Partial–Oxidation Reformer for Automotive Fuel Cells*; available at http://www.uscar.org/pngv/technical/quickstart.htm (Date Not Supplied).

Chang, H., Koschany, P., Lim, C., Kim, J.; "Materials and Processes for Light Weight and High Power Density PEM Fuel Cells," Journal of New Materials for Electrochemical Systems, 3, 55–59 (2000) (Month Unknown).

Journal of Power Sources, The International Journal on the Science and Technology of Electrochemical Energy Systems, vol. 86 (2000) (Month Unknown).

Avista Corp. Corporate News; *Groundbreaking Fuel Cell Patent Issued to Avista Corp. Affiliate Avista Labs*; (Mar. 20, 2000) available at http://www.avistacorp.com/newsrelease/index.asp.

Dutta, S., Shimpalee, S., and Van Zee, J.W.; "Three–dimensional numerical simulation of straight channel PEM fuel cells," *Journal of Applied Electrochemistry*, 30: 135–146, 2000, The Netherlands (Feb.).

* cited by examiner

ENHANCEMENT OF PROTON EXCHANGE MEMBRANE FUEL CELL SYSTEM BY USE OF RADIAL PLACEMENT AND INTEGRATED STRUCTURAL SUPPORT SYSTEM

RELATED APPLICATION

This application is a continuation in part of application Ser. No. 09/669,344 filed Sep. 26, 2000.

BACKGROUND OF THE INVENTION

The present invention relates in general to the field of proton exchange membrane ("PEM") fuel cell systems, and more particularly, to an improved PEM fuel cell system having improved discrete fuel cell modules.

A fuel cell is an electrochemical device that converts fuel and oxidant into electricity and a reaction by-product through an electrolytic reaction that strips hydrogen molecules of their electrons and protons. Ultimately, the stripped electrons are collected into some form of usable electric current by resistance or by some other suitable means. The protons react with oxygen to form water as a reaction by-product.

Natural gas is the primary fuel used as the source of hydrogen for a fuel cell. When natural gas is used, it must be reformed prior to entering the fuel cell. Pure hydrogen may also be used if stored correctly. The products of the electrochemical exchange in the fuel cell are DC electricity, liquid water, and heat. The overall PEM fuel cell reaction produces electrical energy equal to the sum of the separate half-cell reactions occurring in the fuel cell, less its internal and parasitic losses. Parasitic losses are those losses of energy that are attributable to any energy required to facilitate the ternary reactions in the fuel cell. Examples include power to drive pumps and run reformation equipment.

Although fuel cells have been used in a few applications, engineering solutions to successfully adapt fuel cell technology for use in electric utility systems have been elusive. The challenge is to generate power in the range of 1 to 100 kW that is affordable, reliable, and requires little maintenance. Fuel cells would be desirable in this application because they convert fuel directly to electricity at much higher efficiencies than internal combustion engines, thereby extracting more power from the same amount of fuel. This need has not been satisfied, however, because of the prohibitive expense associated with such fuel cell systems. For example, the initial selling price of the 200 kW PEM fuel cell was about $3500/kW to about $4500/kW. For a fuel cell to be useful in utility applications, the life of the fuel cell stack must be a minimum of five years and operations must be reliable and substantially maintenance-free. Heretofore known fuel cell assemblies have not shown sufficient reliability and have disadvantageous maintenance issues. Despite the expense, reliability, and maintenance problems associated with known fuel cell systems, there remains a clear and present need for economical and efficient fuel cell technology for use in residential and light-commercial applications because of their environmental friendliness and operating efficiency.

Fuel cells are usually classified according to the type of electrolyte used in the cell. There are four primary classes of fuel cells: (1) proton exchange membrane ("PEM") fuel cells, (2) phosphoric acid fuel cells, and (3) molten carbonate fuel cells. Another more recently developed type of fuel cell is a solid oxide fuel cell. PEM fuel cells, such as those in the present invention, are low temperature low pressure systems, and are, therefore, well-suited for residential and light-commercial applications. PEM fuel cells are also advantageous in these applications because there is no corrosive liquid in the fuel cell and, consequently, there are minimal corrosion problems.

Characteristically, a single PEM fuel cell consists of three major components—an anode gas dispersion field ("anode"); a membrane electrode assembly ("MEA"); and a cathode gas and liquid dispersion field ("cathode"). As shown in FIG. 1, the anode typically comprises an anode gas dispersion layer 502 and an anode gas flow field 504; the cathode typically comprises a cathode gas and liquid dispersion layer 506 and a cathode gas and liquid flow field 508. In a single cell, the anode and the cathode are electrically coupled to provide a path for conducting electrons between the electrodes through an external load. MEA 500 facilitates the flow of electrons and protons produced in the anode, and substantially isolates the fuel stream on the anode side of the membrane from the oxidant stream on the cathode side of the membrane. The ultimate purpose of these base components, namely the anode, the cathode, and MEA 500, is to maintain proper ternary phase distribution in the fuel cell. Ternary phase distribution as used herein refers to the three simultaneous reactants in the fuel cell, namely hydrogen gas, water vapor and air. Heretofore known PEM fuel cells, however, have not been able to efficiently maintain proper ternary phase distribution. Catalytic active layers 501 and 503 are located between the anode, the cathode and the electrolyte. The catalytic active layers 501 and 503 induce the desired electrochemical reactions in the fuel cell. Specifically, the catalytic active layer 501, the anode catalytic active layer, rejects the electrons produced in the anode in the form of electric current. The oxidant from the air that moves through the cathode is reduced at the catalytic active layer 503, referred to as the cathode catalytic active layer, so that it can oxidate the protons flowing from anode catalytic active layer 501 to form water as the reaction by-product. The protons produced by the anode are transported by the anode catalytic active layer 501 to the cathode through the electrolyte polymeric membrane.

The anode gas flow field and cathode gas and liquid flow field are typically comprised of pressed, polished carbon sheets machined with serpentine grooves or channels to provide a means of access for the fuel and oxidant streams to the anode and cathode catalytic active layers. The costs of manufacturing these plates and the associated materials costs are very expensive and have placed constraints on the use of fuel cells in residential and light-commercial applications. Further, the use of these planar serpentine arrangements to facilitate the flow of the fuel and oxidant through the anode and cathode has presented additional operational drawbacks in that they unduly limit mass transport through the electrodes, and therefore, limit the maximum power achievable by the fuel cell.

One of the most problematic drawbacks of the planar serpentine arrangement in the anode and cathode relates to efficiency. In conventional electrodes, the reactants move through the serpentine pattern of the electrodes and are activated at the respective catalytic layers located at the interface of the electrode and the electrolyte. The actual chemical reaction that occurs at the anode catalyst layer is: $H_2 \rightleftharpoons 2H^+ + 2e^-$. The chemical reaction at the cathode catalyst layer is: $2H^+ + 2e^- + \frac{1}{2}O_2 \rightleftharpoons H_2O$. The overall reaction is: $H_2 + \frac{1}{2}O_2 \rightleftharpoons H_2O$. The anode disburses the anode gas onto the surface of the active catalyst layer comprised of a platinum catalyst electrolyte, and the cathode disburses the cathode gas onto the surface of the catalytic active layer of the electrolyte. However, the anode gas and the cathode gas are not uniformly disbursed onto the electrolyte when using a conventional serpentine construction. Non-uniform distribution of the anode and cathode gas at the membrane surface results in an imbalance in the water content of the electrolyte. This results in a significant decrease in efficiency in the fuel cell.

The second most problematic drawback associated with serpentine arrangements in the electrodes relates to the ternary reactions that take place in the fuel cell itself. Serpentine arrangements provide no pressure differential within the electrodes. This prohibits the necessary ternary reactions from taking place simultaneously. This is particularly problematic in the cathode as both a liquid and a gas are transported simultaneously through the electrode's serpentine pattern.

Another shortcoming of the conventional serpentine arrangement in the anode in particular is that the hydrogen molecules resist the inevitable flow changes in the serpentine channels, causing a build-up of molecular density in the turns in the serpentine pattern, resulting in temperature increases at the reversal points. These hot spots in the serpentine arrangement unduly and prematurely degrade the catalytic active layer and supporting membrane.

In the typical PEM fuel cell assembly, a PEM fuel cell is housed within a frame that supplies the necessary fuel and oxidant to the flow fields of the fuel cell. These conventional frames typically comprise manifolds and channels that facilitate the flow of the reactants. However, usually the channels are not an integral part of the manifolds, which results in a pressure differential along the successive channels. FIG. 2 is an illustration of a conventional frame for the communication of the reactants to a fuel cell. This pressure differential causes the reactants, especially the fuel, to be fed into the flow fields unevenly, which results in distortions in the flow fields causing hot spots. This also results in non-uniform disbursement of the reactants onto the catalytic active layers. Ultimately, this conventional method of supplying the necessary fuel and oxidant to a fuel cell results in a very inefficient process.

As a single PEM fuel cell only produces about 0.30 to 0.90 volts D.C. under a load, the key to developing useful PEM fuel cell technology is being able to scale-up current density in individual PEM cell assemblies to produce sufficient current for larger applications without sacrificing fuel cell efficiency. Commonly, fuel cell assemblies are electrically connected in nodes that are then electrically connected in series to form "fuel cell stacks" by stacking individual fuel cell nodes. Two or more nodes can be connected together, generally in series, but sometimes in parallel, to efficiently increase the overall power output.

These internal foils are often fabricated from graphite or metal. In conventional designs, the bonds between the internal foil and the anode gas flow field and the cathode gas and liquid flow field cause degradation of both the plate and the gas flow fields. This the results in efficiency losses in the fuel cell.

Conventional PEM fuel stacks often flood the cathode due to excess water in the cathode gas flow field. Flooding occurs when water is not removed efficiently from the system. Flooding is particularly problematic because it impairs the ability of the reactants to adequately diffuse to the catalytic active layers. This significantly increases the internal resistance of the cathode which ultimately limits the cell voltage potential. Another problem is dehydration of the polymeric membranes when the water supply is inadequate. Insufficient supply of water can dry out the anode side of the PEM membrane electrolyte, causing a significant rise in stack resistance and reduced membrane durability.

Further, conventional PEM fuel cells and stacks of such fuel cell assemblies are compressed under a large load in order to ensure good electrical conductivity between cell components and to maintain the integrity of compression seals that keep various fluid streams separate. In conventional fuel cells, all of the fuel cells for the fuel cell system are arranged in one stack. These conventional fuel cell assemblies are arranged horizontally between stack end plates. The assemblies in the center of the stack have a tendency to sag due to gravity, pulling them out of alignment and reducing efficiency or forcing a maintenance shutdown. To prevent this sag, designers increase the recommended compressive pressure on the compressive assembly. These compressive forces are often extreme, generally in excess of 40,000 psi, and use compression assemblies, such as tie rods and end plates. If tie rods are used, the tie rods generally extend through holes formed in the peripheral edge portion of the stack end plates and have associated nuts or other fastening means assembling the tie rods to the stack assembly to urge the end plates of the fuel stack assembly toward each other. Typically, the tie rods are external, i.e., they do not extend through the fuel cell electrochemically active components. This amount of pressure that must be used to ensure good electrochemical interactions presents many operational difficulties. For example, if the voltage of a single fuel cell assembly in a stack declines significantly or fails, the entire stack must be taken out of service, disassembled, and repaired, resulting in significant repair costs and down-time. Second, inadequate compressive force can compromise the seals associated with the manifolds and flow fields in the central regions of the interior distribution plates, and also compromise the electrical contact required across the surfaces of the plates and MEAs to provide the serial electrical connection among the fuel cells that make up the stack. Third, the extreme compressive force used unduly abrades the surfaces of the fuel cell modules within the stack, resulting in wear of components in the fuel cell assemblies such as the catalyst layers of the electrolyte, thereby leading to increased losses in fuel cell stack and fuel cell assembly efficiency.

One of the maintenance problems associated with conventional fuel cells is replacement of failed fuel cell, modules. Because conventional fuel cell modules are often arranged into one tall stack, a failed fuel cell module necessitates unstacking the modules to reach the failed module, replacement of the failed module, and finally, restacking the modules. Typical existing fuel cell assemblies require that the entire stack be out of operation during this exercise that may require several hours. Electricity is not generated during this maintenance operation.

Another of the disadvantages associated with the organization of fuel cell assemblies into tall stacks are the costs and problems associated with internal support of the weight of the fuel cell assemblies. Typical fuel cell assemblies are arranged so that an individual fuel cell assembly must support the weight of all of fuel cell assemblies above it. The stack of fuel cell assemblies exert a large downward force on the bottom fuel cell modules of the stack. Fuel cell assemblies must be designed to accommodate this force, and so are made thicker and more resilient than would otherwise be necessary. This additional thickness of the individual fuel cell assemblies makes the assemblies more expensive. Further, a higher motive force is necessary to drive reactants and the reacted product through the fuel cell. A higher motive force requires larger pumps and larger pipe sizes to move the reactants and product, driving up the amount of power needed to run the fuel cell assembly. This is commonly referred to as a higher parasitic load. The higher the parasitic load, the less electricity is available to users and devices outside of the internal workings of the fuel cell assembly.

The serpentine patters of the typical fuel cell assemblies and stacks also increase parasitic loads. Pumps must drive fluids through the labyrinthine patterns of conventional fuel cells, patterns that often consist of capillary tubes. Often, fluids must pass through multiple cell modules in series. This tortured flow path makes larger pumps and lines necessary, further increasing costs and parasitic loads. Larger balance of plant assemblies and the arrangement of traditional fuel cell plants increase the size of the footprint of the overall fuel cell plant. This may be undesirable, typically in residential settings where homeowners view large fuel cell plants as unsightly.

SUMMARY OF THE INVENTION

An economical and efficient fuel cell assembly and fuel cell stack assembly are provided herein that have optimized supply systems and mass transport systems.

Most broadly, the present invention is a fuel cell system with a reformer subassembly and a plurality of fuel cell stacks. The fuel cell stacks are so arranged as to substantially surround the reformer assembly with each fuel cell stack having a plurality of fuel inlet channels. Each fuel cell stack also has an fuel inlet channel, an air inlet channel and an air and water outlet channel. An air supply header connects a means for supplying air to the fuel cell stack with the air inlet channel of each fuel cell stack. Further, an air and water return header serves to discharge air and water from the air and water outlet channel. A fuel supply header serves to connect the reformer subassembly to the top of the plurality of fuel inlet channels of each fuel cell stack. A fuel discharge header is connected to the bottom of the fuel inlet channel of each fuel cell stack.

In another embodiment of the present invention, the fuel cell stack of the fuel cell system contains two end plates aligned with each other, a plurality of fuel cell assemblies interposed between the first end plate and the second end plate. Each fuel cell assembly is composed of an open-cell foamed gas flow field, an open-cell foamed gas and liquid flow field, and an MEA. The fuel cell assembly further has an internal foil. The internal foil has an anode connection surface and a cathode connection surface with the anode connection surface bonded to the gas flow field of a first fuel cell assembly and the cathode connection surface bonded to the gas and liquid flow field of a second fuel cell assembly. The fuel cell stack further has a compression assembly.

One advantage of the present invention is that fuel cell stack replacement is simplified. Because individual fuel cell stacks may be removed and replaced, rather than unstacked and then restacked, maintenance operations for failed fuel cell assemblies are quicker, with less down time.

Another advantage of the present invention is the ease in altering the fuel cell system to accommodate a need to increase or decrease voltage as the individual fuel cells are externally strapped allowing both series and parallel connections. Because of the system architecture, voltage capacity may be added to each fuel cell stack merely by adding fuel cell assemblies to each stack.

Still another advantage of the present invention is that parasitic loads are reduced by reducing pressure drop. Because the weight of each fuel cell assembly has been reduced, each fuel cell assembly may be made thinner, reducing the need for a larger motive force to move hydrogen and air through the fuel cell assemblies. This results in smaller pumps and blowers for bulk transport of reactants and products. In addition, because the reformer is centrally located, distances to each fuel cell stack are minimized, further reducing pressure drop and the need for a large motive force. Also, because of the fuel supply and air supply channels created in the present invention, large pressure drops are eliminated in delivering the fuel and air to the fuel cell itself for air and fuel supply, as well as liquid removal. The central location of the reformer also facilitates heat management.

Yet another advantage of the present invention is the small footprint of the fuel cell system. Because of the central location of the reformer, and the reduced sizes pumps and blowers, the fuel cell system may be made more compact.

Another advantage of the present invention is that it may load follow. Because there is no serpentine arrangement in the gas and gas and liquid flow fields, an increase in demand for electricity may be quickly met by increasing flow of fuel and air.

Another advantage is that the invention achieves optimal mass transport through the open cell foamed electrodes and the distribution frame of the present invention. This increases the overall efficiency and maximum power achievable by the fuel cell. Further, the anode gas and cathode gas are uniformly disbursed on the electrolyte, resulting in optimal water balance in the fuel cell system. Flooding and drying out of the electrolyte are thereby avoided.

Other advantages of the present invention will be apparent to those ordinarily skilled in the art in view of the following specification claims and drawings.

BRIEF DESCRIPTION OF THE DRAWINGS

A more complete understanding of the present embodiments and advantages thereof may be acquired by referring to the following description taken in conjunction with the accompanying drawings, in which like numbers indicate like features, and wherein.

DETAILED DESCRIPTION OF THE INVENTION

Figure 1:
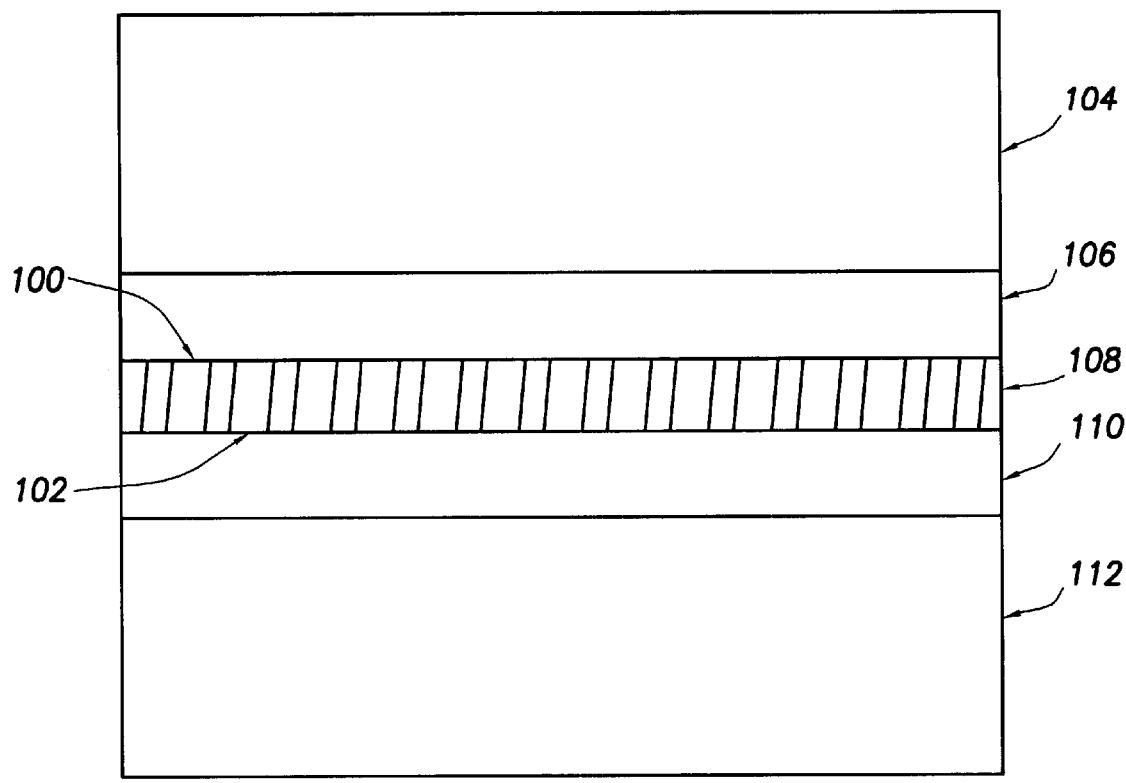
FIG. 1 is a schematic of a typical PEM fuel cell assembly.
Figure 2:
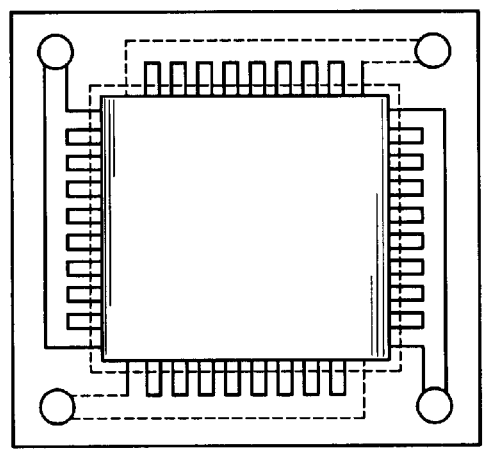
FIG. 2 is an illustration of a conventional frame for housing and supplying reactants to a fuel cell assembly.
Figure 3:
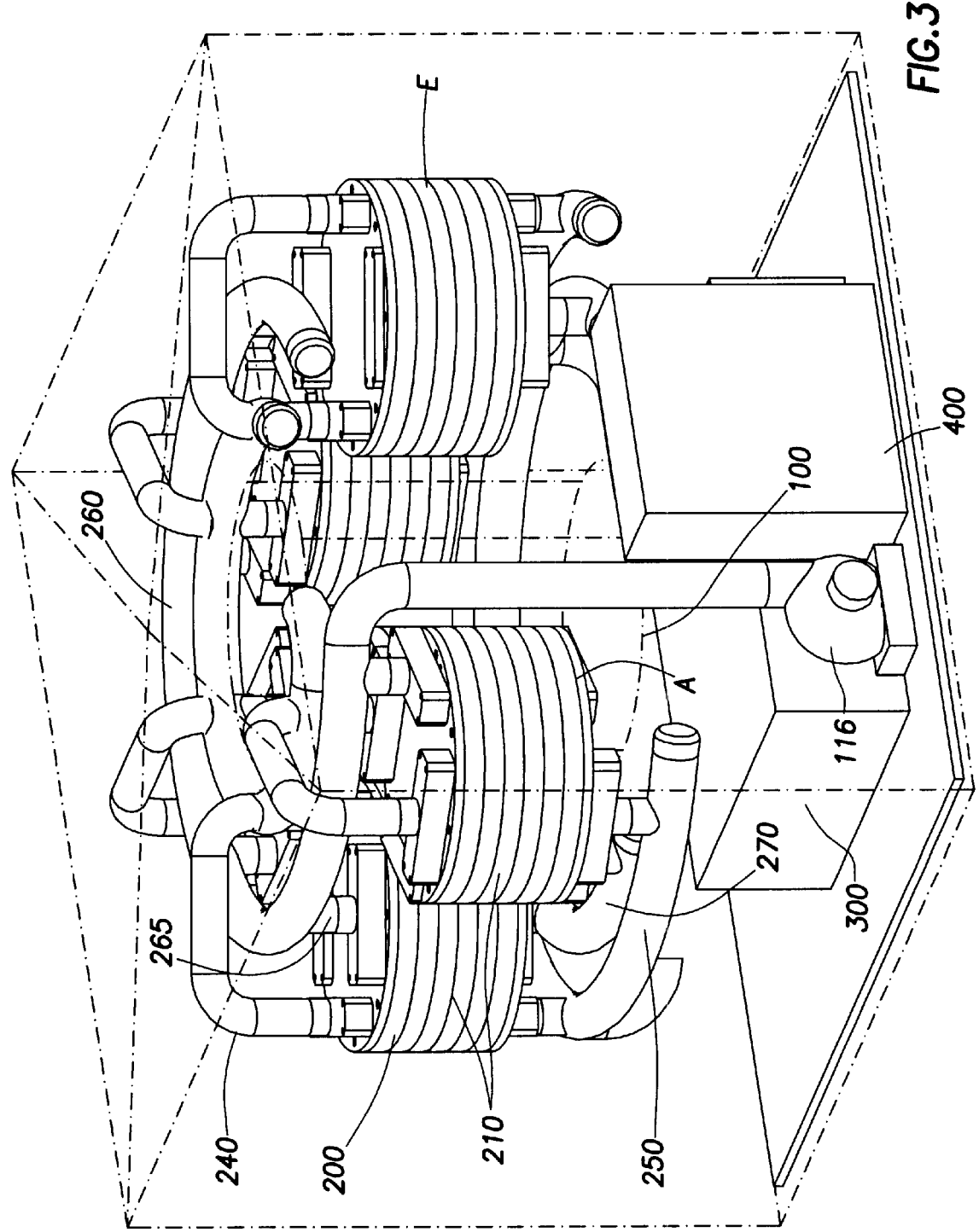
FIG. 3 is a depiction of the overall fuel cell system.

As shown in FIG. 3, the proton exchange membrane ("PEM") fuel cell system of the present invention is comprised of three primary subassemblies. In reformer subassembly 100, natural gas is reacted with air to form hydrogen and waste products. In fuel cell subassembly 200, PEM fuel cell stacks and associated piping react the hydrogen formed in reformer subassembly 100 with air to form water and direct current ("DC") power. In power conditioning subassembly 300, DC power formed in fuel cell subassembly 200 is converted to alternating current ("AC") power.

Reformer Subassembly

The present invention may be operated with any currently-known type of reformer. The purpose of the reformer is to convert natural gas, which consists primarily of methane, to hydrogen for use in the fuel cell. Currently available types of reformers are partial oxidation, autothermal, closed-loop adiabatic, and steam reformers. In addition, hybrid types of reformers may be used that combine partial oxidation with steam reformation.

Each type of reformer reacts the incoming natural gas to form hydrogen and a variety of waste gases. For autothermal and partial oxidation reformers, the typical discharge stream from the reformer contains 45–52% hydrogen, 25–35% carbon dioxide, 30–300 ppm carbon monoxide, with the balance being nitrogen. For closed loop adiabatic and steam reformers, the typical discharge stream from the reformer contains 80–84% hydrogen, 10–12% carbon dioxide, 50–150 ppm carbon monoxide, with the balance being nitrogen. These values are merely typical, and the present invention is not limited to these ranges. Further, the present invention may be operated with any type of reformer that produces a discharge stream with more than 45% hydrogen and no more than 350 ppm carbon monoxide.

Catalyst poisons such as ethyl moncaptan contained in the natural gas stream are preferably removed prior to reformation and use in fuel cell subassembly 200. This may be accomplished through any known gas separation technology, most often through an activated carbon cannister.

As shown in FIG. 3, reformer subassembly 100 is preferentially located in the center of and surrounded by equipment associated with fuel cell subassembly 200.

Fuel Cell Subassembly

As further shown in FIG. 3, fuel cell subassembly 200 is composed primarily of a plurality of PEM fuel cell stacks 210 (labeled A through E) and associated inlet and outlet piping to PEM fuel cell stacks 210. The PEM fuel cell stacks 210 are located around the exterior of reformer subassembly 100. Thus, each of PEM fuel cell stacks 210 is so arranged as to minimize the distance between the center of reformer subassembly 100 and the center of each of PEM fuel cell stacks 210. This acts to reduce the pressure drop associated with long piping runs or labryinthine piping paths.

Each of PEM fuel cell stacks 210 is composed of one or more nodes. Each node is composed of at least two individual fuel cell assemblies. The fuel cell assembly of the present invention is described in related U.S. application Ser. No. 09/669,344, which is hereby incorporated by reference. Each fuel cell assembly within the fuel cell node is electrically connected to the fuel cell assemblies adjacent to it, i.e., a fuel cell assembly in the middle of a node with three or more fuel cell assemblies would be electrically connected to the fuel cell assembly above it and the fuel cell assembly below it. The fuel cell assemblies within each node are assembled so that the cathode terminal of one fuel cell assembly is connected to the anode terminal of the adjacent fuel cell assembly, i.e. electrically connected in series. Connecting the individual fuel cell assemblies within each node in series sums the voltage of each individual fuel cell assembly within the node. Thus, in one embodiment of the present invention where each node has six fuel cell assemblies and each fuel cell assembly produces 0.5 volts, the node would produce 3.0 volts of DC power. Further, the series connection of the PEM fuel cell assemblies within the node produces a node with an anode and a cathode. In one embodiment of the present invention, each individual fuel cell subassembly is externally strapped to the fuel cell assemblies surrounding it, i.e., the anode and cathode of the fuel cell assembly are extended outside of the fuel cell assembly body through the use of electrically conductive materials and are thereby connected to other fuel cell subassemblies through sub assembly connectors. In this way, sub assembly connectors may be used not only to connect individual fuel assemblies in series, but also in parallel, or a combination of both within a single stack.

Each node is connected to the node(s) adjacent to it within a PEM fuel cell stack 210, the anode of one node electrically connected to the cathode of the node adjacent. This produces a PEM fuel cell stack with an anode and a cathode. In one embodiment of the invention, a series of six 3.0 volt nodes are connected in series to form a PEM fuel cell stack 210 that produces 15.0 volts of DC power. In another embodiment of the present invention, PEM fuel cell stacks 210 are connected in series, with the anode of one PEM fuel stack 210 connected to the cathode of the adjacent stack(s) 210. This produces a total current equal to the sum of the voltages of each PEM fuel stack 210. FIG. 3 depicts one embodiment of a fuel cell system with five PEM fuel stacks 210, producing a total voltage of 60.0 volts DC power.

Figure 4:
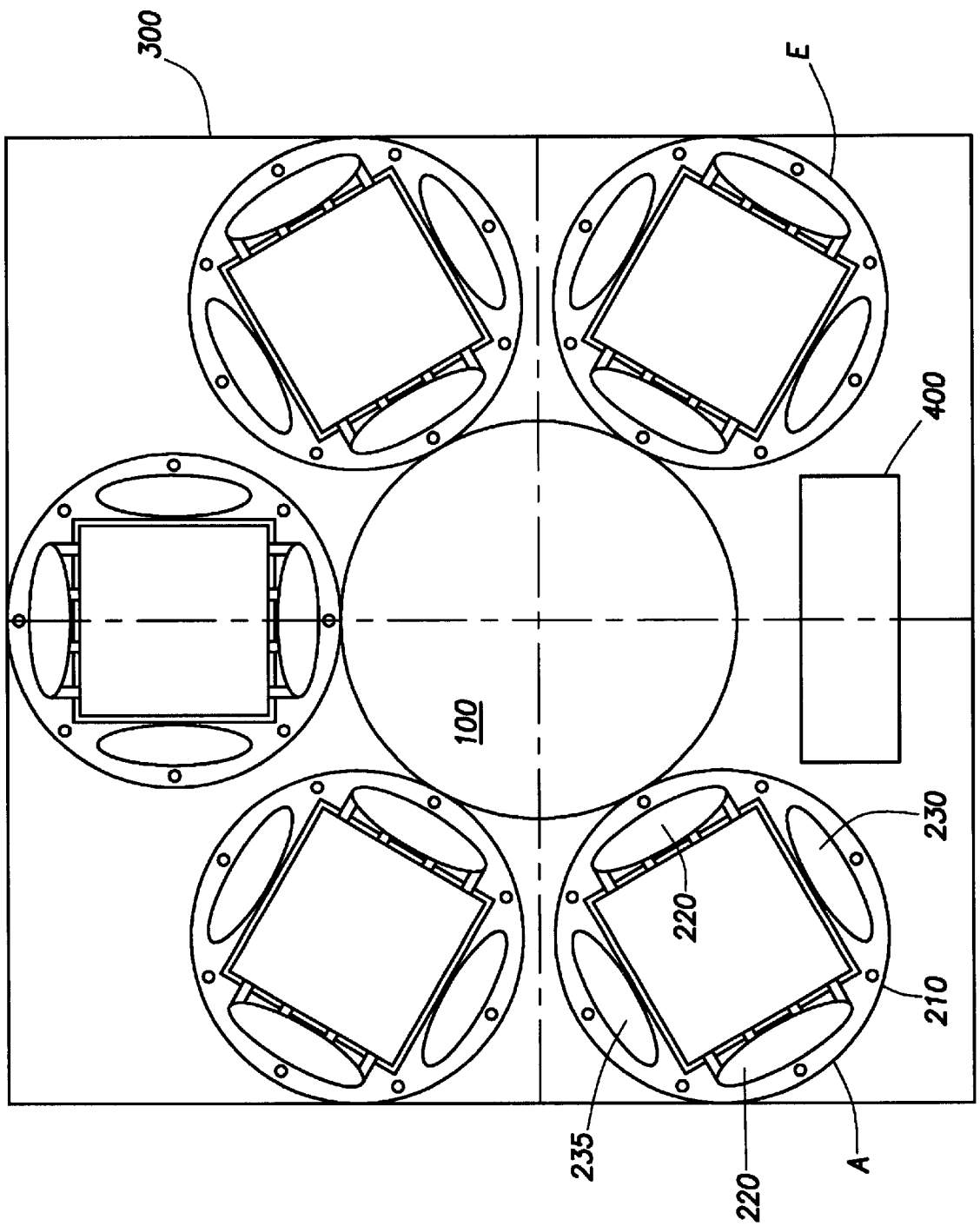
FIG. 4 is a cross sectional view of the overall fuel cell system.
Figure 5:
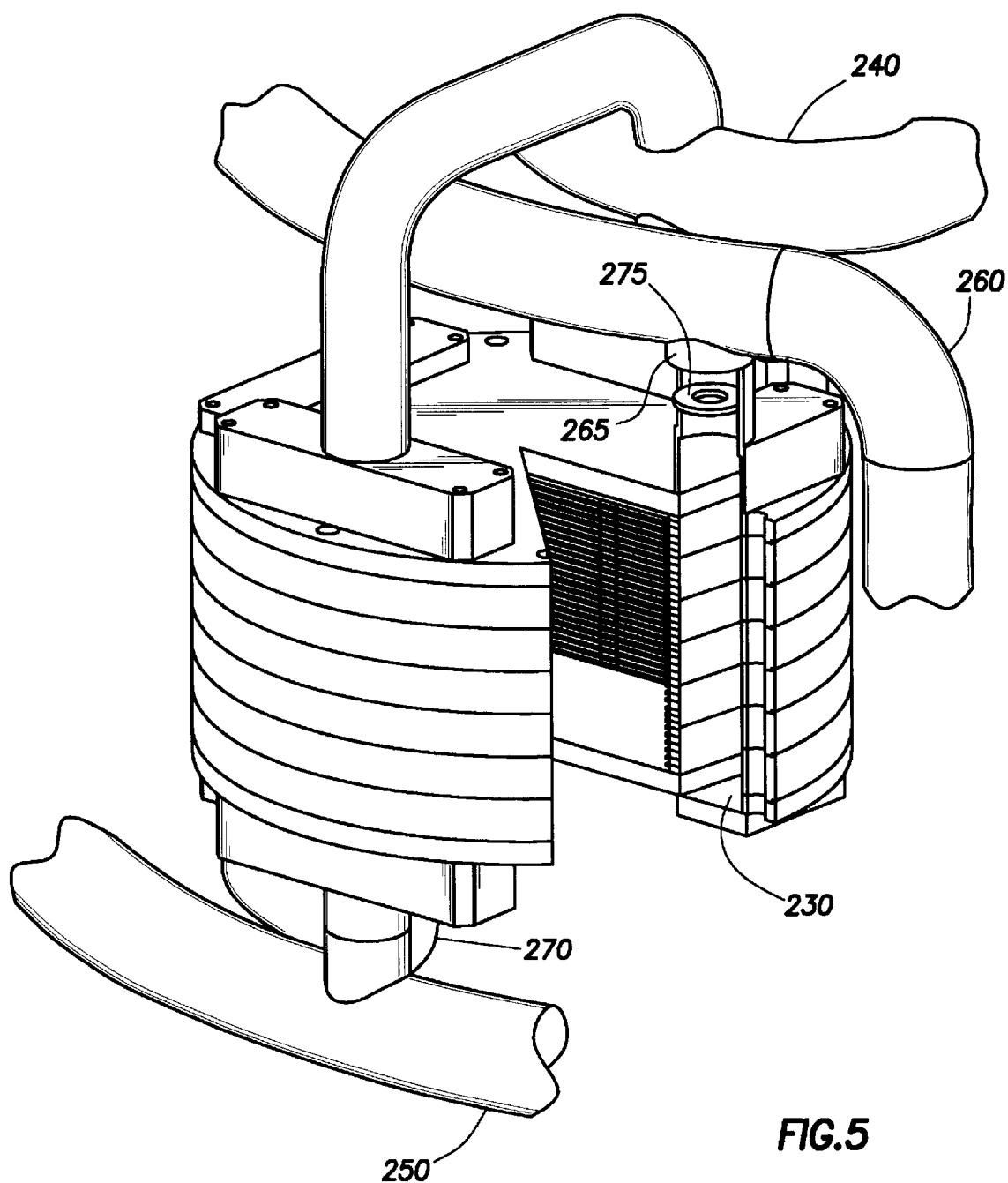
FIG. 5 is a cutaway view of an individual fuel cell stack assembly with associated piping.

In addition to the electrical connections between fuel cell assemblies and nodes, there are physical connections between each fuel cell assembly and node within a PEM fuel stack 210. The fuel cell assemblies within each PEM fuel stack 210 are stacked so as to provide continuous fuel inlet channels 220, a continuous air inlet channel 230, and a continuous air and water outlet channel 235. As shown in FIG. 4, two fuel inlet channels 220, one air inlet channel 230, and one air and water outlet channel 235 are so formed. Fuel outlet channels 220 are located 180 degrees apart. Air inlet channel 230 is located 180 degrees apart from air and water outlet channel 235. FIG. 5 further shows the effect of stacking fuel assemblies into a fuel cell stack. Continuous air channel 230 is formed by the stacking of multiple fuel cell assemblies.

As shown in FIG. 3, the discharge stream from reformer subassembly 100 to each PEM fuel cell stack 210 is through hydrogen inlet header 240. Hydrogen inlet header 240 transports hydrogen and $CO_2$ generated in reformer subassembly 100 to PEM fuel cell stacks 210 for conversion into protons and electrons. The fuel cell assemblies are designed to convert nearly the entirety of the hydrogen supplied to PEM fuel cell stacks 210. In contrast, carbon dioxide and nitrogen are inert gases in the fuel cell and are not reacted, but are effectively transported by the microchannel system. Carbon monoxide is a temporary catalyst poison that will slowly deactivate the catalyst in the anode layer of the fuel cell if this concentration is allowed to exceed 180 ppm.

As shown in FIG. 3, hydrogen inlet header 240 connects to the top of each PEM fuel cell stack 210, specifically to the top of each fuel inlet channel 220. The bottom of one fuel inlet channel 220 is connected to fuel return header 250 through the use of a bottom return valve (not shown). The bottom return valve is normally closed during operation of the fuel cell system. As hydrogen is reacted in the fuel cell assemblies of each PEM fuel stack 210, hydrogen is replaced by reformer subassembly 100 through hydrogen inlet header 240. Because carbon dioxide, nitrogen, and carbon monoxide are not reacted, they are retained in fuel inlet channel 220, increasing the partial pressure of nitrogen, carbon dioxide and carbon monoxide and reducing the partial pressure of hydrogen in fuel inlet channel 220. When the carbon dioxide, nitrogen, and carbon monoxide partial pressures reach a certain preset limit, control cabinet 400 briefly opens the bottom return valve, releasing the hydrogen/carbon dioxide/nitrogen/carbon monoxide mixture in fuel inlet channel 220 into fuel return header 250. Fuel return header 250 is connected to reformer subassembly 100. Carbon dioxide, nitrogen and carbon monoxide are then exhausted through reformer assembly 100.

Because the bottom return valve is normally closed, and the nitrogen/ hydrogen/carbon dioxide/carbon monoxide mixture is supplied by reformer assembly 100 to replace the hydrogen lost in conversion to protons and electrons in the fuel cell assemblies, the pressure in each fuel inlet channel 220 in each PEM fuel cell stack 210 is maintained at a constant pressure. When the bottom return valve is briefly opened by control cabinet 400, the reformer supplies new hydrogen, nitrogen, carbon dioxide and carbon monoxide to fill fuel inlet channels 220.

As shown in FIG. 3, the discharge of air blower 116 is connected to air inlet header 260. In one embodiment of the present invention, air is filtered to remove particulate matter prior to air inlet header 260. Air inlet header 260 connects to air header transition 265 at the top of each PEM fuel cell stack 210, specifically to the top of air inlet channel 230. The bottom of air and water outlet channel 235 is connected to air return header 270. Because some of the oxygen in air inlet channel 220 is reacted by the fuel cell assemblies, the remaining oxygen/nitrogen mixture is depleted somewhat in oxygen content ("oxygen-depleted air"). The amount of oxygen depletion is dependent upon operating conditions and ambient conditions, but is generally about 4–18%. Water generated by the fuel cell and oxygen depleted air exit PEM fuel cell stacks 210 through air return header 270. Water is then separated from the oxygen depleted air through any typical gas/liquid separator, most commonly a screen set in air return header 270 separator perpendicular to the airflow in air return header 270. In one embodiment of the present invention, some of the water separated by the gas/liquid is used to humidify fuel in fuel supply header 240. Typically, approximately 40% of the water separated is so used. The remainder of the water separated may be vaporized in the reformer or otherwise disposed of. Air so treated is typically humidified to 20–35% relative humidity. The oxygen depleted air is then conveyed through air return header 270 to the suction of air blower 116, where is it mixed with incoming air.

It is important to the operation of the fuel cell that the pressure of the air in air inlet channels 220 remain constant in all PEM fuel cell stacks 210 so as to maintain balanced diffusion rates of air through the fuel cell assemblies. This allows each PEM fuel stack 210 to provide approximately equal voltage to power conditioning box 300. As shown in FIG. 5, in one embodiment of the present invention, this is accomplished by balancing the pressure drop through each transition piece 265. The pressure of the air at the entrance of transition piece 265 associated with PEM fuel stack 210 A is higher than that at the entrance of transition piece 265 associated with PEM fuel stack 210 E, because the air pressure drops in air inlet header 260 as it proceeds from PEM fuel stack 210 A to PEM fuel stack 210 E. In order to equalize the pressure in all transition pieces 265, varioussized orifices 275 are incorporated in each different pair of transition pieces 265. The smallest-sized orifice 275 are placed in PEM fuel cell stack 210 A, and the largest at PEM fuel cell stack 210 E. Proper sizing of orifices 275 in transition pieces 265 is well-known to those of skill in the art.

Power Conditioning Subassembly

Figure 6:
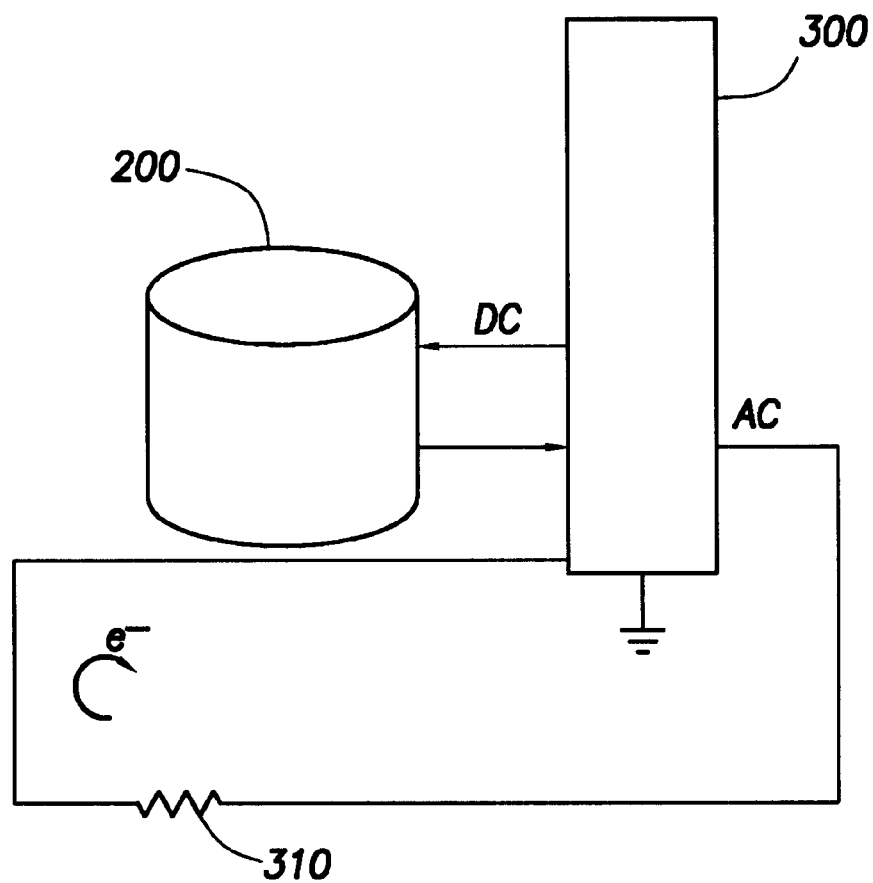
FIG. 6 is a schematic of the electrical distribution and conversion of the present invention.

Power conditioning subassembly 300 converts the DC power generated in fuel cell subassembly 200 into AC power, usable in typical electrical appliances. As shown in FIG. 6, DC power generated in fuel cell subassembly 200 is routed to power conditioning subassembly 300, where it is converted into AC power. This AC power is then sent to the electrical users, shown as load 310 in the circuit. After the voltage drop of the electrical users, the circuit is completed by routing the current back to power conditioner 300. Power conditioner subassembly 300 is also connected to ground. The AC power frequency may be varied by power conditioning subassembly 300.

Control Cabinet

As shown in FIG. 3, control cabinet 400 provides control for all three subassemblies. Electronics within control cabinet provide for communication with external electronic devices such as modems. These electronics within control cabinet 400 also provide for monitoring of such conditions as hydrogen pressure within the fuel cell system, pressure of the air and fuel within the fuel cell stacks 210, and condition of equipment such as air blower 116. These electronics also control the status of air blower 116 and the bottom return valve, as well as other equipment within the three subassemblies. The fuel cell assemblies used in the present invention are described below.

PEM Fuel Cell Assemblies

Figure 7:
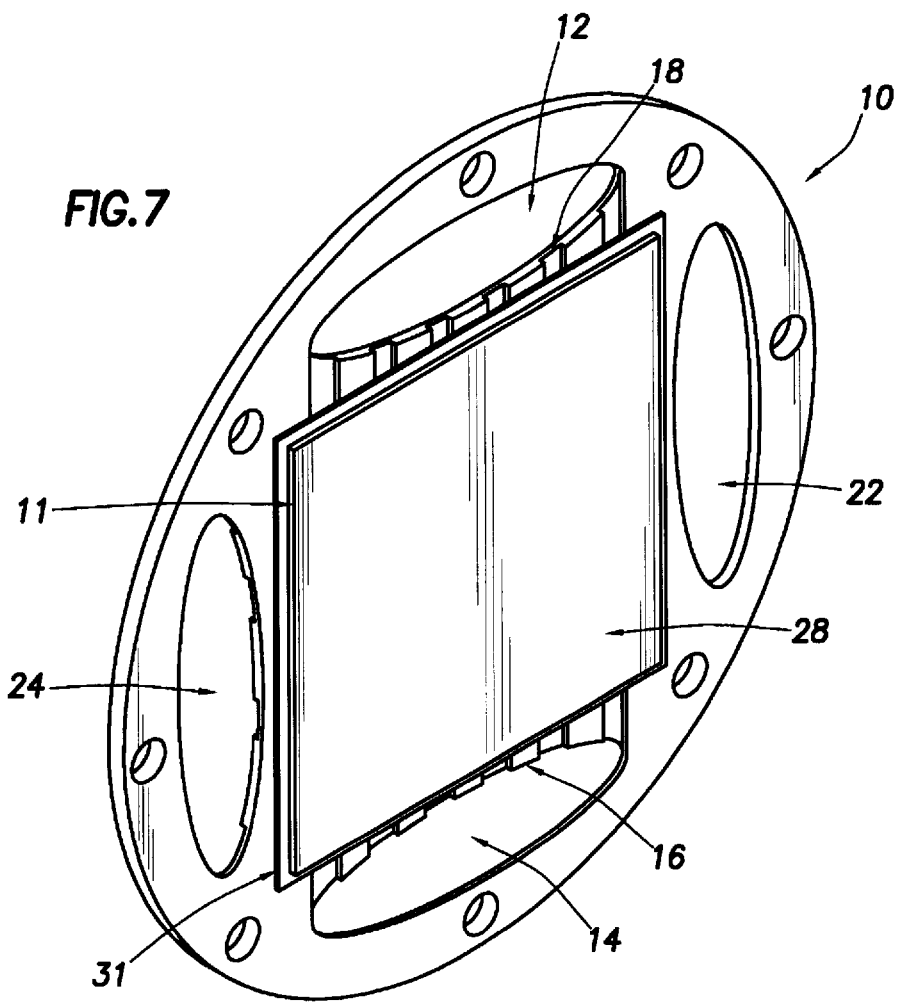
FIG. 7 is a depiction of a distribution frame housing a fuel cell assembly.

FIG. 7 depicts one embodiment of an individual fuel cell assembly of the present invention. As shown in FIG. 7, fuel cell 11 is housed within distribution frame 10. Distribution frame 10 not only houses fuel cell 11, but also facilitates transportation of the fuel and the oxidant to the fuel cell necessary for the electrochemical exchange in the fuel cell. This individual fuel cell assembly can be combined with other fuel cell assemblies to form a fuel cell node, and ultimately a stack assembly, to provide higher voltages and current for power generation. Of note in FIG. 7 are fuel inlet 22, fuel inlet 24, air inlet 12 and air and water outlet 14. The fuel inlets 22 and 24, air inlet 12, and air and water outlet 14 are apertures in the distribution frame extending completely through the distribution frame, and run perpendicular, or at 90° angles, from one another in the distribution frame to facilitate the efficient flow of the fuel and oxidant to and through the anode gas and liquid flow field and cathode gas flow field, respectively.

Figure 8:
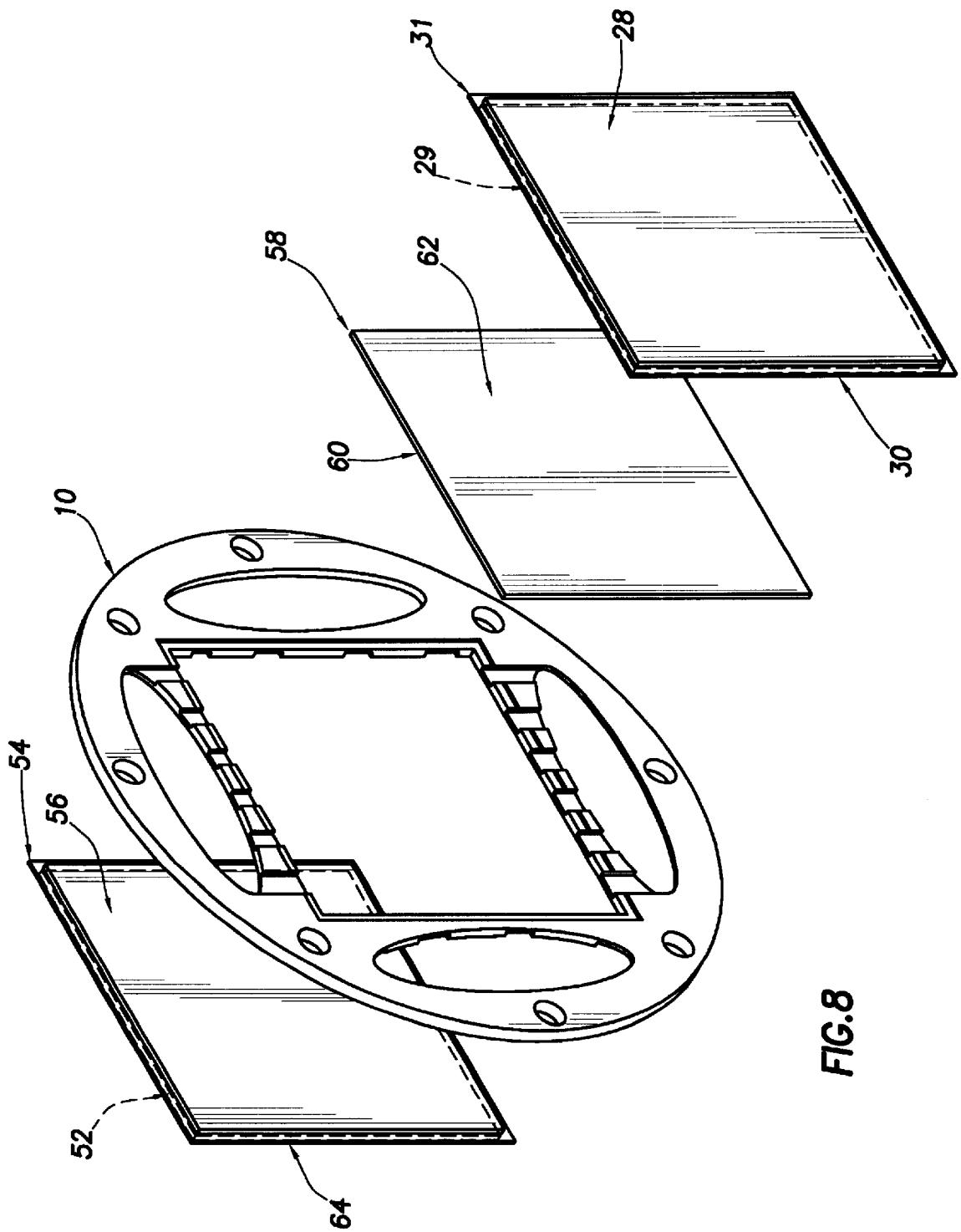
FIG. 8 is an exploded view of the distribution frame and a fuel cell assembly.

FIG. 8 more particularly illustrates the component parts of the fuel cell assembly of one embodiment of the present invention depicted in FIG. 7, specifically distribution frame 10, primary internal foil assembly 64, fuel cell 11 and secondary internal foil assembly 30. Primary internal foil assembly 64 consists of primary anode gas flow field 52, primary internal foil 54 and primary cathode gas and liquid flow field 56. Primary internal foil 54 serves as a boundary layer between primary anode gas flow field 52 and primary cathode gas and liquid flow field 56 to keep air from flowing into the anode gas flow field from the cathode and water from flowing from the cathode gas and liquid flow field to the anode gas flow field. MEA 58 is composed of an electrolyte, primary cathode catalytic active layer 60, and secondary anode catalytic active layer 62. Any known MEAs may be used in the present invention. Conventional fluorocarbon based polymeric membranes are particularly suitable for the present invention-including Nafion membranes. Primary cathode catalytic active layer 60 is bonded to primary cathode gas and liquid flow field 56 when the fuel cell is assembled. Secondary internal foil 31 also serves as a boundary layer between the anode and cathode electrodes of the internal foil assembly as does primary internal foil 54. Secondary anode catalytic active layer 62 is bonded to secondary anode gas flow field 29 when the fuel cell assembly is assembled. FIG. 8 illustrates the assembled fuel cell placed in distribution frame 10 wherein secondary cathode gas flow field 28 is in view. Secondary internal foil 31 is also illustrated in FIG. 7.

When the fuel cell assembly of the present invention is assembled as in the embodiments depicted in FIGS. 7 and 8, the procession of layers is: primary anode gas flow field 52, primary internal foil 54, primary cathode gas flow field 56, MEA 58, secondary anode gas flow field 29, secondary internal foil 31, and secondary cathode gas flow field 28. This defines the elements of one fuel cell of the present invention terminated by internal foil assemblies. Primary cathode catalyst layer 60 and secondary anode catalyst layer 62 of the MEA shown in FIG. 8 may be comprised of platinum or a platinum/ruthenium catalyst. If platinum is used, it is typically combined with fibrous material, including suitable nonwovens, or suitable cotton muslin sheets or pieces of fabric. Primary cathode gas flow field 56 and secondary anode gas flow field 29 are bonded to primary cathode catalytic active layer 60 and secondary anode catalytic active layer 62, respectively, through mechanical bonding means such as compression or adhesion. However, there is no need for excessive compressive force in the present invention to create the electrochemical connections between the catalytic active layers and the gas flow fields. Compression may be provided by any known means, such as a tie-rod assembly. In general, the compressive force on a fuel cell stack should be less than 100 psi, preferably less than 45 psi.

In one embodiment of the present invention, the support for fuel cell stacks 210 is from air inlet header 260 and fuel inlet header 240. Where the compression assembly is a tie-rod assembly, each fuel cell assembly is attached individually to the tie-rod that extends through each fuel cell assembly in the fuel cell stack. The tie-rod assemblies are then connected to a support plate, which is connected to the air inlet header 260 and fuel inlet header 240. In this way, the support for each fuel cell assembly is from the tie-rod assembly and ultimately from air inlet header 260 and fuel inlet header 240.

Figure 9:
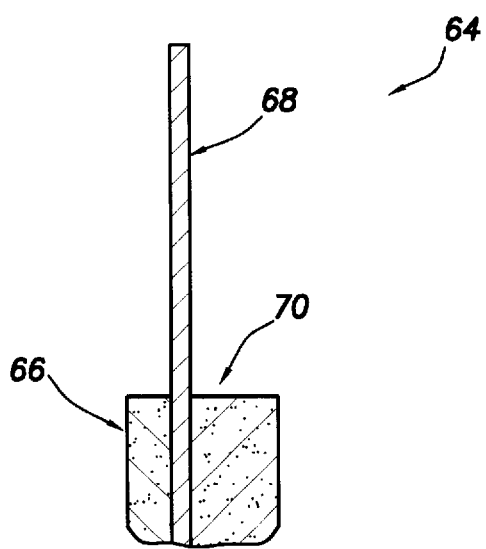
FIG. 9 is a cross-sectional view of an internal foil assembly.
Figure 10:
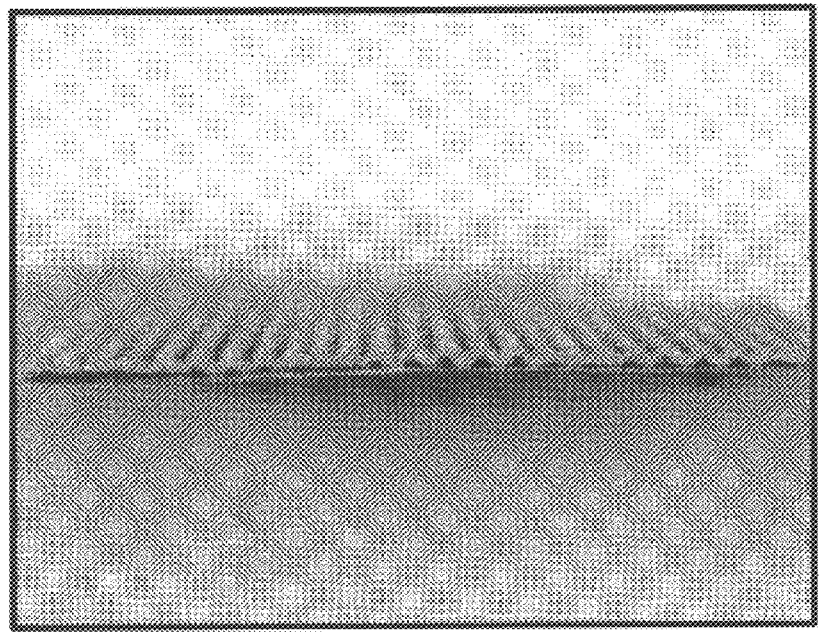
FIG. 10 is an electron micrograph of a three-dimensional open-cell foamed cathode gas and liquid flow field with microchannels.
Figure 10A:
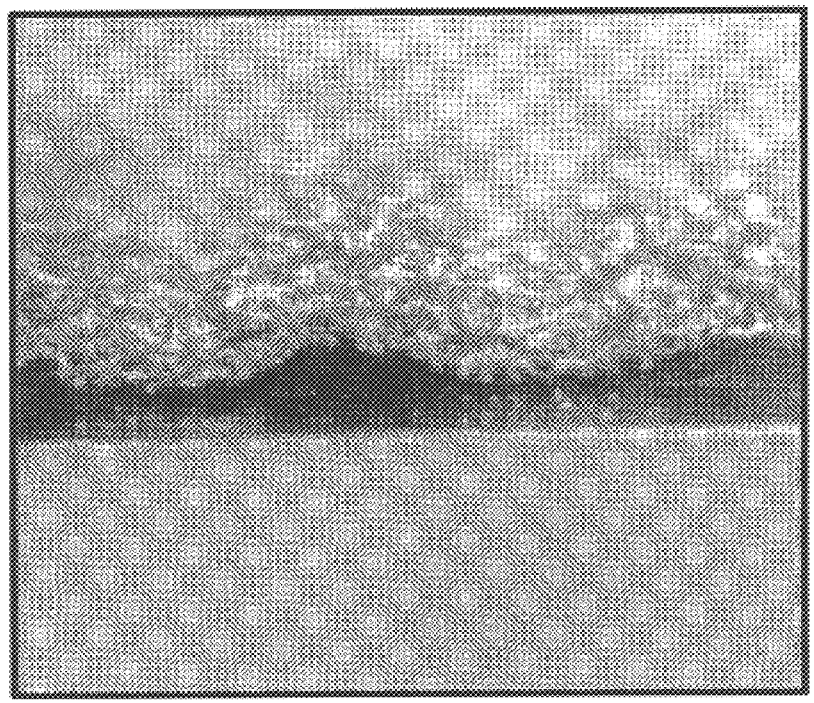
FIG. 10A is an electron micrograph of the three-dimensional open-cell foamed cathode gas and liquid flow field with microchannels magnified 10 times.
Figure 10B:
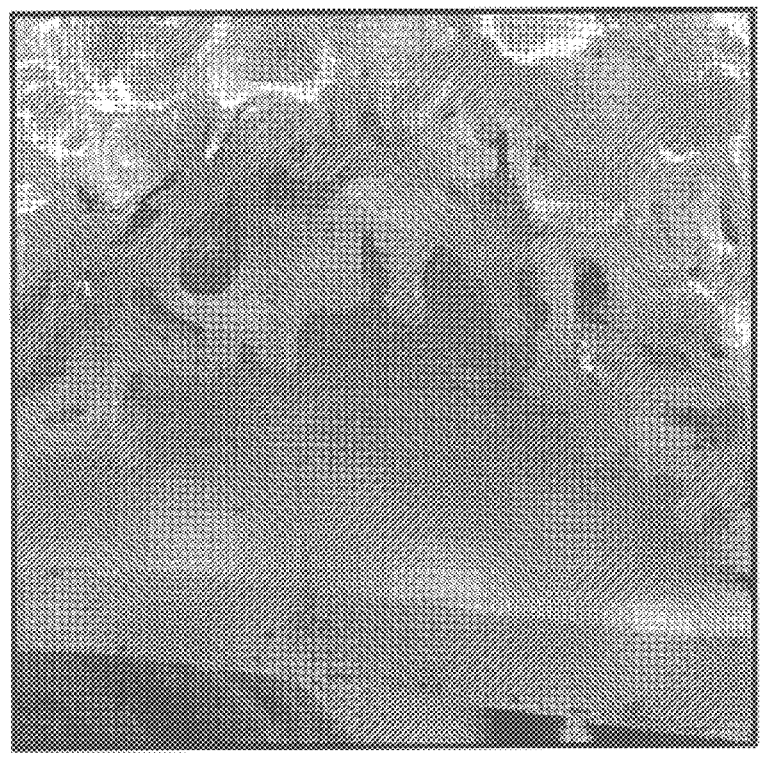
FIG. 10B is an electron micrograph of the three-dimensional open-cell foamed cathode gas and liquid flow field with microchannels magnified 20 times.

FIG. 9 is a cross-section of an internal foil assembly of the present invention. Internal foil assembly 64 is comprised of three parts: anode gas flow field 66, internal foil 68, and cathode gas and liquid flow field 70. The cross section of the anode gas flow field 66 may be preferably approximately half the size of cathode gas and liquid flow field 70 to accommodate the ratios of reactants necessary for the electrochemical exchange in the fuel cell. Both anode gas flow field 66 and cathode gas and liquid flow field 70 may be composed of a three-dimensional open-cell foamed structure suitable for gas diffusion that, preferably, may be plated with gold. In another embodiment of the present invention, cathode gas flow field 70 may be corrugated to create microchannels. FIG. 10 illustrates a corrugated cathode gas and liquid flow field of the present invention. These microchannels facilitate the removal of free water and excessive heat from the fuel cell assembly. When the fuel cell is placed in the distribution frame, these microchannels in the cathode gas and liquid flow field 70 run parallel to the air inlet and air and water outlet, and perpendicular to the fuel inlets. The vertical distance between the peak of a corrugation and the trough next to it, herein referred to as the pitch, should be at least ⅔ of the horizontal distance between a peak of one corrugation to the peak of the next corrugation, herein referred to as the run. Whereas, as shown in FIG. 9, anode gas flow field 66 is metallurgically bonded to internal foil 68; in an alternative embodiment cathode gas and liquid flow field 70 is only bonded to the internal foil at the peaks of the corrugations. As shown in FIG. 10, the cathode gas and liquid flow field is therefore intermittently bonded to the internal foil at the peaks of the microchannels. This structure effectively manages the ternary reactions necessary for fuel cell operability by adequately removing the water and facilitating the movement of hydrogen and air. FIGS. 10A and 10B depict magnified views of the microchannels shown in FIG. 10.

Suitable construction materials for the three-dimensional open-cell foamed gas flow fields and gas and liquid flow fields are conducive to flow distribution and possess good electrical conductivity properties. These may include: tin oxide, plastics, carbon filament, stainless steel and its derivatives, epitaxial substrates, nickel and its alloys, gold and its alloys, and copper and its alloys. Iridium may also be used if it has sufficient electrochemical properties. In one embodiment of the present invention, the anode gas flow field and the cathode gas and liquid flow fields are made from open-cell foamed nickel. The open-cell foamed nickel flow fields are produced by electroplating nickel over a particulate plastic so that the voids created by the tangential intersections in the particulate plastic structure are filled with nickel. Although polystyrene maybe used in this method of producing the foamed flow field structure, other materials, such as other particulate thermoplastic resinous materials, would also be suitable in this process. Another suitable material, for example, would be Isinglass. If nickel is used, the nickel may be enhanced with 2.0% by weight of cobalt. The addition of cobalt enhances the mechanical strength of the nickel and reduces the drawing properties of the nickel. The addition of cobalt also strengthens the lattice structure of the finished open-cell foamed flow field. Once the nickel has cooled, the polystyrene plastic may be blown out of the foam with hot carbon dioxide gas or air leaving a three-dimensional nickel open-cell foamed flow field structure having substantially five-sided geometrically-shaped orifices. The nickel foamed flow field is autocatalytically microplated with up to 15 microns of tin oxide, gold, iridium, copper or silver. Preferably, the flow field is microplated, with between 0.5 to 2.0 microns of gold.

Figure 11:
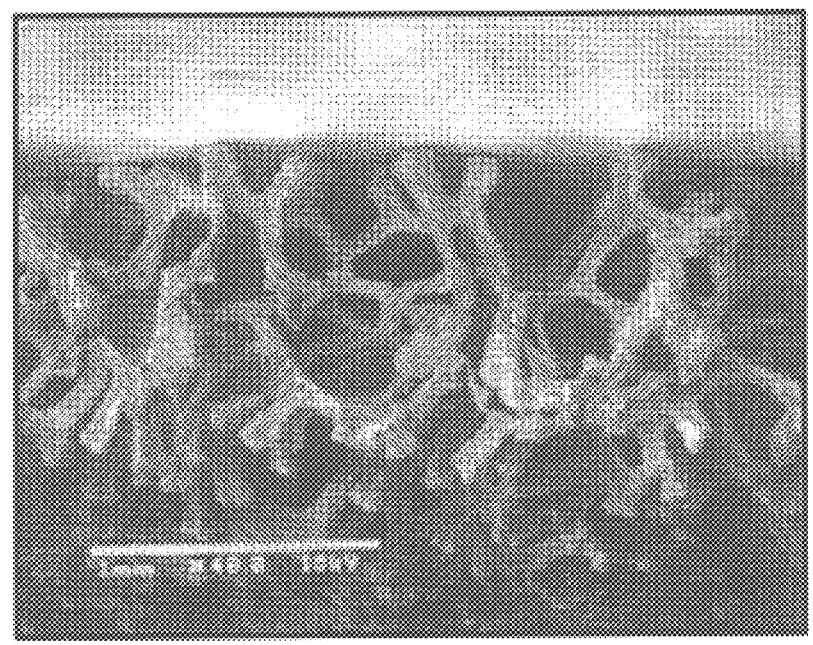
FIG. 11 is an electron micrograph of the connections between a three-dimensional open-cell foamed gas flow field and an internal foil in an internal foil assembly.
Figure 12:
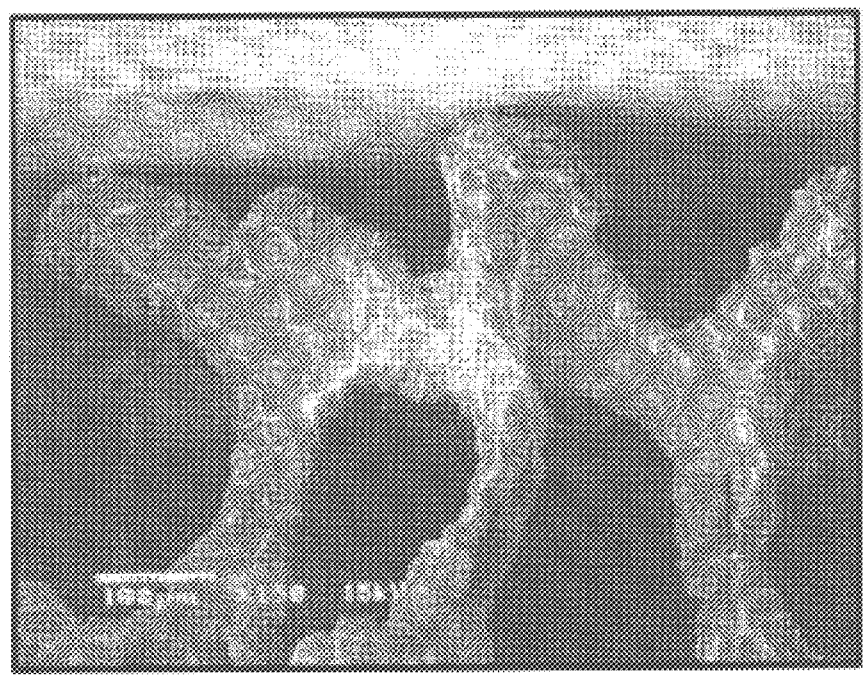
FIG. 12 is an electron micrograph of the connections between the three-dimensional open-cell foamed gas flow field magnified 150 times.

FIGS. 11 and 12 are electron micrographs of a three-dimensional open-cell foamed flow field of the present invention wherein the substantially five-sided orifices are visible and have been plated with gold. The advantage obtained from utilizing a three-dimensional open cell foamed flow field in the present invention is that it enhances mass transfer within the flow fields. This is because the mass transfer rate is supplemented by the foamed flow field itself and its wicking ability, which allows the molecules to electromosaticaly move through the flow field. Another advantage associated with the foamed flow fields of the present invention is that they also facilitate the deposit of the reactants uniformly along the surface of the catalytic active layers. A further distinct advantage of the foamed flow fields over conventional serpentine arrangements is that the foamed flow fields enhance the ternary reactions of the fuel cell. The gold plating further enhances the electromosatic movement of the molecules through the flow fields by providing microridges, evident in FIGS. 11 and 12, on the surfaces of the foamed structure's orifices. These microridges facilitate the flow of the fuel, oxidant, and water in the flow fields. The gold plating enhances mass transfer by increasing the surface area of the foam by as much as a factor of nine. Another advantage of gold plating the foamed flow field of the present invention is that the leaflet potential of the gold preserves the structure of the foamed flow fields by preventing the flow fields from undergoing electrolysis. This enhances the life of the flow fields and the fuel cell assembly itself, making the fuel cell assemblies of the present invention suitable for residential and light-commercial uses.

As shown in FIG. 9, in internal foil assembly 64, anode gas flow field 66 and cathode gas and liquid flow field 70 are attached to primary internal foil 68 through mechanical bonding, such as sintering, plating, pressing, rolling, drawing, or extruding. Another connections means would include laminating through electrochemical adhesives. This increases the electrical conductivity through the internal foil assembly by decreasing the air gap between the flow fields and the internal foil. Preferably, internal foil 68 is plated with gold as are the flow fields so as to create an undisturbed electrical connection between the flow fields and the internal foil. When a gold-plated nickel foam is used, an alloy of copper and silver should be used to sinter the gold plated, nickel foam to internal foil assembly 64.

Figure 13:
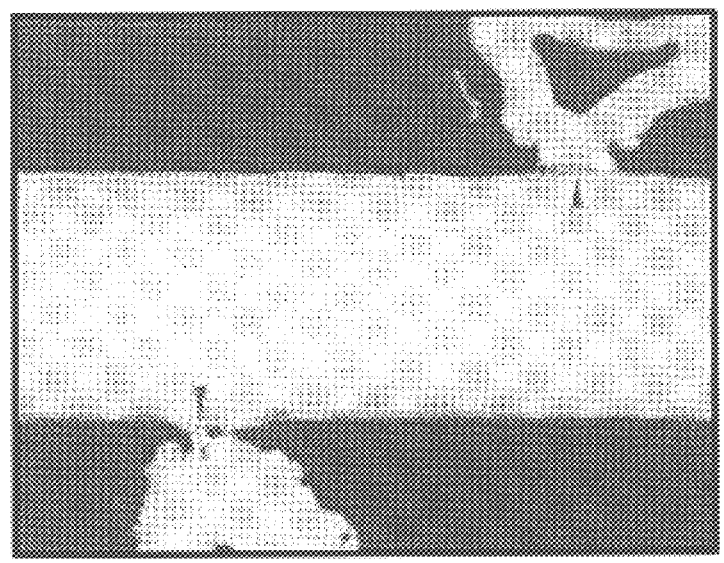
FIG. 13 is an electron micrograph of two individual connections between the three-dimensional open-cell foamed gas flow field and the internal foil of an internal foil assembly of one embodiment of the present invention.
Figure 14:
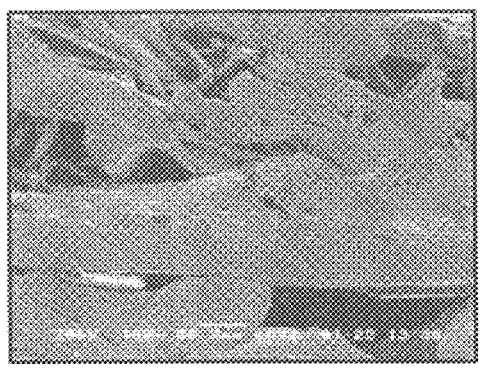
FIG. 14 is an electron micrograph of a conventional internal foil assembly formed using conventional techniques.

FIG. 13 is an electron micrograph of one embodiment of the internal foil assembly of one embodiment of the present invention illustrating the connection as shown in FIG. 9 between anode gas flow field 66, cathode gas flow field 70, and internal foil 68, wherein all three elements have been gold plated. As can be particularly seen by the arrows in FIG. 13, the substantially five-sided orifices of the open-cell foamed gas flow fields are not deformed by the bonding process of the present invention. FIG. 14 comparatively illustrates the deformation the gas flow field suffer if bonded to the internal foil using conventional techniques. The electrically consistent connection achieved in the present invention between the flow fields and the internal foil which provides for more efficient mass transfer in the internal foil assembly of the present invention.

Figure 15:
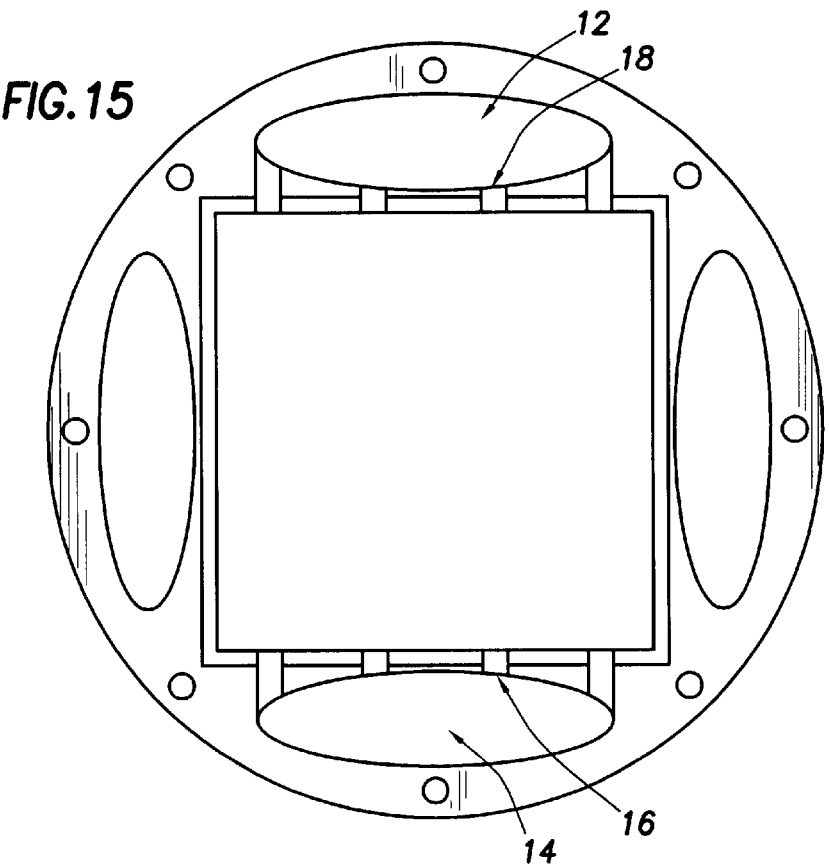
FIG. 15 is an illustration of the fuel side of a distribution frame for a fuel cell assembly.

Shown in FIG. 15 is one embodiment of the anode side of distribution frame 10. Fuel inlet 12 and fuel inlet 14 provide the fuel to the fuel cell housed within the cavity of distribution frame 10 necessary for the electrochemical reaction. Specifically, the fuel is fed to the anode gas flow field through fuel supply channels 18 and 16 that stretch from the interior sides or surfaces of fuel inlet 12 and fuel inlet 14, respectively. Fuel supply channels 18 and 16 are shaped such that the supply of the fuel to the anode is preferably maintained at a constant velocity, i.e., the channels are of sufficient length, width and depth to provide fuel to the anode at a constant velocity. The velocity of the fuel entering the anode gas flow field via fuel supply channels 18 and 16 may be less than the velocity of oxidant entering the cathode gas flow field via air supply channels 25. The number of fuel supply channels in the distribution frame stoichiometrically balances the number of air supply channels so as to achieve a 2.0 to 1.0 to 2.8 to 1.0, preferably 2.0 to 1.0 to 2.4 to 1.0, air to fuel ratio. Fuel supply channels 18 and 16 also provide an edge-on connection between the fuel supply inlets and the anode gas flow field of the fuel cell housed within the cavity of the distribution frame to allow for enhanced dispersion of the fuel through the anode gas flow field. Suitable materials of construction for distribution frame 10 include nylon-6, 6, derivatives of nylon-6, 6, polyetheretherketone ("PEEK"), ABS styrene, mylar, textar, kevlar or any other nonconductive thermoplastic resin. Preferably, distribution frame 10 is formed from nylon-6, 6, and, if used in a stack assembly, the end plates of the fuel cell stack assembly are preferably formed from PEEK. Nylon 6,6 has good compression properties. Distribution frame 10 is preferably substantially circular.

Figure 16:
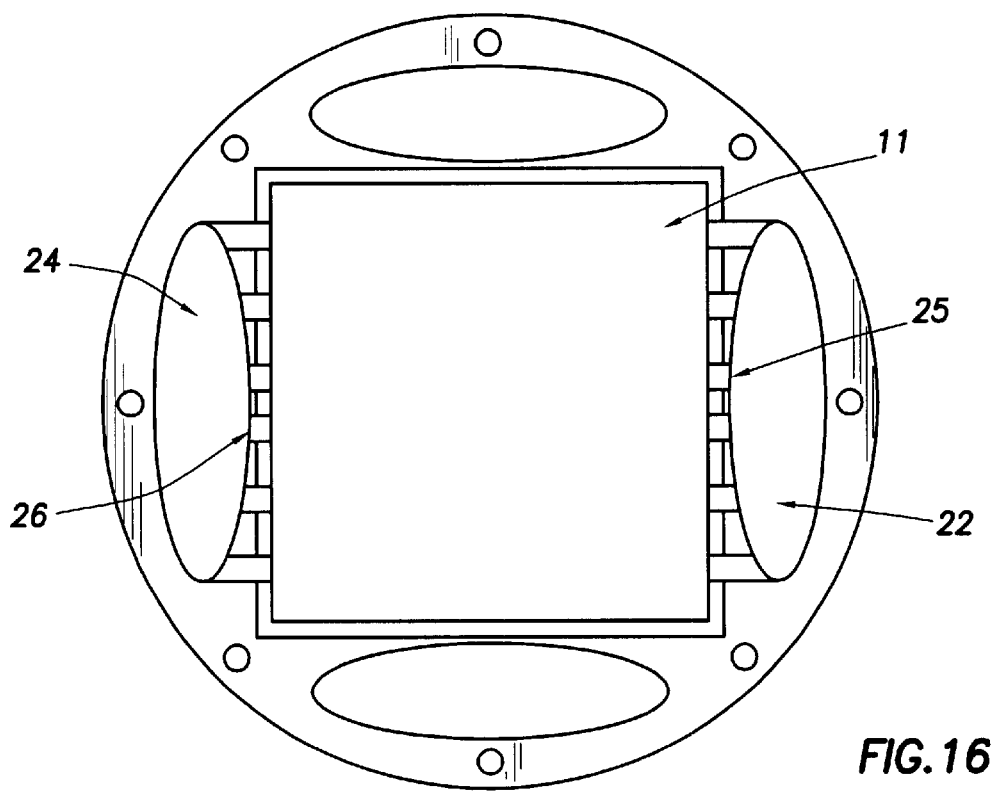
FIG. 16 is an illustration of the air side of a distribution frame for a fuel cell assembly.

Shown in FIG. 16 is the cathode side of distribution frame 10. Air, is a necessary reactant for the electrochemical exchange, and may be fed to fuel cell 11 via air inlet 24 in combination with air supply channels 26. Air supply channels 26 stretch from the interior surface or side of air inlet 24 to fuel cell 11, and are of such sufficient size and shape that they enable air to be fed to the cathode gas flow field at a constant velocity, i.e., they are of sufficient height, width and depth. The number of fuel supply channels 18 and 16 will most often exceed the number of air supply channels 26 to maintain a stoichiometric balance of the reactants. Free water is formed continuously in the cathode gas and liquid flow field as a by-product of the electrochemical reaction. As described, the open-cell foamed cathode gas and liquid flow field facilitates the removal of this free water from the cathode gas and liquid flow field efficiently. In an alternative embodiment of the present wherein the cathode gas flow field is corrugated, the microchannels in the cathode gas flow field enhance free water removal from the system. Air and water outlet 22 and air and water outlet channels 25 facilitate the flow of this free water from fuel cell 11 to allow for optimal water management in the fuel cell, and to avoid flooding and the resultant loss in power. In a stack assembly, this free water may be transported for use in other parts of the fuel cell unit, unit here meaning the balance of plant assembly. Air and water outlet 22 and air and water outlet channels 25 also facilitate dissipation of the heat generated by the electrochemical reactions.

Figure 17:
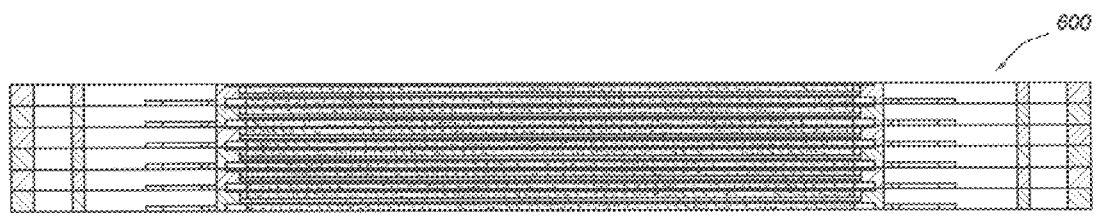
FIG. 17 is an illustration of a fuel cell stack assembly of the present invention.

FIG. 17 is a cross-section of a fuel cell stack assembly shown generally at 600 that encompasses a plurality of fuel cell assemblies. Two or more individual fuel cell assemblies can be combined to form a node. Two or more nodes can be combined to form a fuel cell stack assembly. Typically, these individual fuel cells will be interposed between end plates, which are preferably substantially circular. Stacks can be placed in series to increase voltage. Stacks can be arranged in parallel to increase amperes. In one embodiment of the present invention, 1 end plate is used for every 6 fuel cell assemblies frames to provide desirable torsional properties to the fuel cell stack assembly.

Although the present disclosure has been described in detail, it should be understood that various changes, substitutions, and alterations can be made hereto without departing from the spirit and the scope of the invention as defined by the appended claims.

What is claimed is:

1. A fuel cell system comprising:

(a) a reformer subassembly;

(b) a plurality of fuel cell stacks, the plurality of fuel cell stacks so arranged as to substantially surround the reformer assembly, each fuel cell stack having a plurality of fuel inlet channels, each fuel inlet channel having a top and a bottom, and each fuel cell stack having an air inlet channel and an air and water outlet channel;

(c) an air supply header, the air supply header serving to connect a means for supplying air to each fuel cell stack with the air inlet channel of each fuel cell stack;

(d) an air and water return header, the air and water return header connected to the air and water outlet channel;

(e) a fuel supply header, the fuel supply header serving to connect the reformer subassembly to the top of the plurality of fuel inlet channels of each fuel cell stack; and (f) a fuel discharge header, the fuel discharge header connected to the bottom of the fuel inlet channel of each fuel cell stack.

2. The fuel cell system according to claim 1, wherein the reformer subassembly is a partial oxidation, auto-thermal, closed-loop adiabatic or steam reformer.

3. The fuel cell system according to claim 1, wherein the air supply header further comprises a plurality of transition pieces and main supply header, each transition piece further comprising an orifice, each transition piece so situated as to connect the main supply header to the air supply channel of each fuel cell stack.

4. The fuel cell system according to claim 3, wherein each orifice of each transition piece is so sized as to be able to balance the pressure of a supply of air to each fuel cell stack.

5. The fuel cell system according to claim 1, wherein the fuel discharge header further comprises a bottom outlet valve, the bottom outlet valve acting to connect the fuel discharge header to the fuel outlet channel.

6. The fuel cell system according to claim 1, wherein the air and water outlet header further comprises a water removal device.

7. The fuel cell system of claim 1, wherein each fuel cell stack is radially placed around the reformer assembly.

8. The fuel cell system of claim 1, wherein each fuel cell stack is comprised of a node, wherein each node is comprised of a PEM fuel cell assembly.

9. The fuel cell system of claim 8, wherein each node of at least one fuel cell stack is comprised of a plurality of PEM fuel cell assemblies and wherein each PEM fuel assembly within each node is externally strapped.

10. The fuel cell system of claim 8, wherein each PEM fuel cell assembly comprises:

(a) an MEA, the MEA having two catalytic active layers, the MEA further having an anode side and a cathode side;

(b) a gas diffusion layer, the gas diffusion layer having a top face and a bottom face, the bottom face of the gas diffusion layer juxtaposed to the anode side of the MEA;

(c) a gas and liquid diffusion layer, the gas and liquid diffusion layer having a top face and a bottom face, the top face of the gas and liquid diffusion layer juxtaposed to the cathode side of the MEA;

(d) an anode gas flow field comprising a three-dimensional open-cell foamed structure suitable for gas diffusion, the anode gas flow field juxtaposed to the top face of the gas diffusion layer; and (e) a cathode gas and liquid flow field comprising a three-dimensional open-cell foamed structure suitable for gas and liquid diffusion, the cathode gas and liquid flow field juxtaposed to the bottom face of the gas and liquid diffusion layer.

11. The fuel cell system according to claim 10, wherein the wherein the cathode gas and liquid flow field of the PEM fuel cell assembly has corrugations, the corrugations creating microchannels, the corrugations further having a pitch and a run, and the microchannels running parallel to the air supply channels.

12. The fuel cell system according to claim 11 wherein the pitch of the corrugations of the cathode gas and liquid flow field of the PEM fuel cell assembly is greater than or equal to $2/3$ of the run of the corrugations.

13. The fuel cell system according to claim 10 wherein the anode gas flow field of the PEM fuel cell assembly comprises tin oxide, nickel, alloys of nickel, copper, alloys of copper, gold or alloys of gold.

14. The fuel cell system according to claim 10 wherein the cathode gas and liquid flow field of the PEM fuel cell assembly comprises tin oxide, nickel, alloys of nickel, copper, alloys of copper, gold, and alloys of gold.

15. The fuel cell system according to claim 10 wherein the anode gas flow field or the cathode gas and liquid flow field of the PEM fuel cell assembly are plated with tin oxide, gold, iridium, silver or copper.

16. The fuel cell system according to claim 10 wherein the MEA of the PEM fuel cell assembly further comprises a platinum or a platinum/ruthenium catalyst.

17. The fuel cell system according to claim 10 wherein the electrolyte of the PEM fuel cell assembly is a perfluorosulfonic acid membrane.

18. The fuel cell system according to claim 10 wherein the gas diffusion layer and the gas and liquid diffusion layer of the PEM fuel cell assembly comprise a fibrous layer.

19. A fuel cell system according to claim 1, wherein each fuel cell stack comprises:

(a) a first end plate and a second end plate, the second end plate being aligned with the first end plate;

(b) a plurality of fuel cell assemblies interposed between the first end plate and the second end plate, each fuel cell assembly comprising an open-cell foamed gas flow field, an open-cell foamed gas and liquid flow field, and an MEA; and (c) an internal foil, the internal foil having an anode connection surface and a cathode connection surface, the anode connection surface being bonded to the gas flow field of a first fuel cell assembly and the cathode connection surface being bonded to the gas and liquid flow field of a second fuel cell assembly wherein the fuel cell assemblies are under compression.

20. The fuel cell stack system according to claim 19 wherein the first end plate or the second end plate of at least one fuel cell stack are made of polyetheretherketone.

21. The fuel cell stack system according to claim 19 wherein the first end plate or the second end plate of at least one fuel cell stack are substantially circular members.

22. The fuel cell system according to claim 19 wherein the compression on at least one fuel cell stack exerts less than 45 psi of compressive force.

23. The fuel cell system according to claim 22, wherein the weight of each individual fuel cell assembly is supported from the air supply header or the fuel supply header.

24. The fuel cell system according to claim 19 wherein the gas flow field and the gas and liquid flow field of at least one fuel cell assembly are comprised of tin oxide, nickel, alloys of nickel, copper, alloys of copper, gold, or alloys of gold.

25. The fuel cell system according to claim 19 wherein the gas flow field, the gas and liquid flow field, or the internal foil of at least one fuel cell assembly are plated with tin oxide or gold.

26. The fuel cell system according to claim 19 wherein the electrolyte foil of at least one fuel cell assembly is a fluorocarbon-based electrolyte.

27. The fuel cell system according to claim 19 wherein the MEA of at least one fuel cell assembly comprises a gas diffusion layer, the gas diffusion layer being located between the gas flow field and the electrolyte, and a gas and liquid diffusion layer, the gas and liquid diffusion layer being located between the gas and liquid flow field and the electrolyte.

28. The fuel cell system according to claim 27 wherein the MEA of at least one fuel cell assembly further comprises a platinum or a platinum/ruthenium catalyst.

* * * * *